(12) United States Patent
Yoshida

(10) Patent No.: US 6,456,398 B1
(45) Date of Patent: Sep. 24, 2002

(54) METHOD AND APPARATUS FOR DATA COMMUNICATION WITH IMPROVED TRANSMISSION EFFICIENCY

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/172,059

(22) Filed: Oct. 14, 1998

(30) Foreign Application Priority Data

Oct. 14, 1997 (JP) ............................................. 9-296276
Nov. 7, 1997 (JP) ............................................. 9-305093
Jan. 6, 1998 (JP) ............................................. 10-012158

(51) Int. Cl.[7] ................................................ H04N 1/00
(52) U.S. Cl. ..................................... 358/400; 358/1.15
(58) Field of Search ................................. 358/400, 405, 358/407, 409, 434, 435, 436, 438, 439, 440, 442, 468, 1.15; 379/100.01, 100.05, 100.06, 100.9

(56) References Cited

U.S. PATENT DOCUMENTS 4,729,033 A * 3/1988 Yoshida ....................... 358/257
5,592,307 A * 1/1997 Murai .......................... 358/468
5,721,731 A * 2/1998 Yoshida ....................... 358/400

FOREIGN PATENT DOCUMENTS

JP 11122465 * 10/1995

* cited by examiner

Primary Examiner—Jerome Grant, II
Assistant Examiner—Negussie Worku
(74) Attorney, Agent, or Firm—Fitzpatrick, Cella, Harper & Scinto

(57) ABSTRACT

Reliable communication can be made between new and old communication apparatuses having different byte numbers of FIF of a DIS signal. If communication using a new version DIS cannot be established, an old version DIS is used.

22 Claims, 36 Drawing Sheets

METHOD AND APPARATUS FOR DATA COMMUNICATION WITH IMPROVED TRANSMISSION EFFICIENCY

BACKGROUND OF THE INVENTION

1. Field of the Invention

The present invention relates to a communication apparatus such as a facsimile apparatus capable of communication using a DIS signal having a variable length FIF.

2. Related Background Art

In a conventional facsimile apparatus, a facsimile information field (FIF) of a DIS signal has a constant number of bytes, which signal is sent to a transmission side apparatus in order to notify a capability of a reception side apparatus.

FIF of the DIS signal had 4 bytes several years before, and has increased recently to 10 bytes. A facsimile apparatus shipped around 1985 was not designed to use a DIS signal having 10 bytes of FIF so that if this DIS signal is sent, a communication error occurs.

A facsimile apparatus capable of V. 8 or V. 34 communication, formally recommended by ITU-T in 1996 can receive as a DIS signal having 10 bytes of FIF. However, since a G3 facsimile apparatus manufactured in the first half of 1980's was recommended by ITU-T, FIF of a DIS signal was permitted up to 4 bytes. Therefore, the apparatus of that period can receive only a DIS signal having 4 bytes or smaller of FIF unless the apparatus was designed to expand FIF. As a fact, the V. 8, V. 34 facsimile apparatus cannot communicate with such an old type of facsimile apparatus.

SUMMARY OF THE INVENTION

It is an object of the present invention to provide reliable communication between new and old communication apparatuses having different byte numbers of FIF of a DIS signal.

DETAILED DESCRIPTION OF THE PREFERRED EMBODIMENTS

First Embodiment

Figure 1:
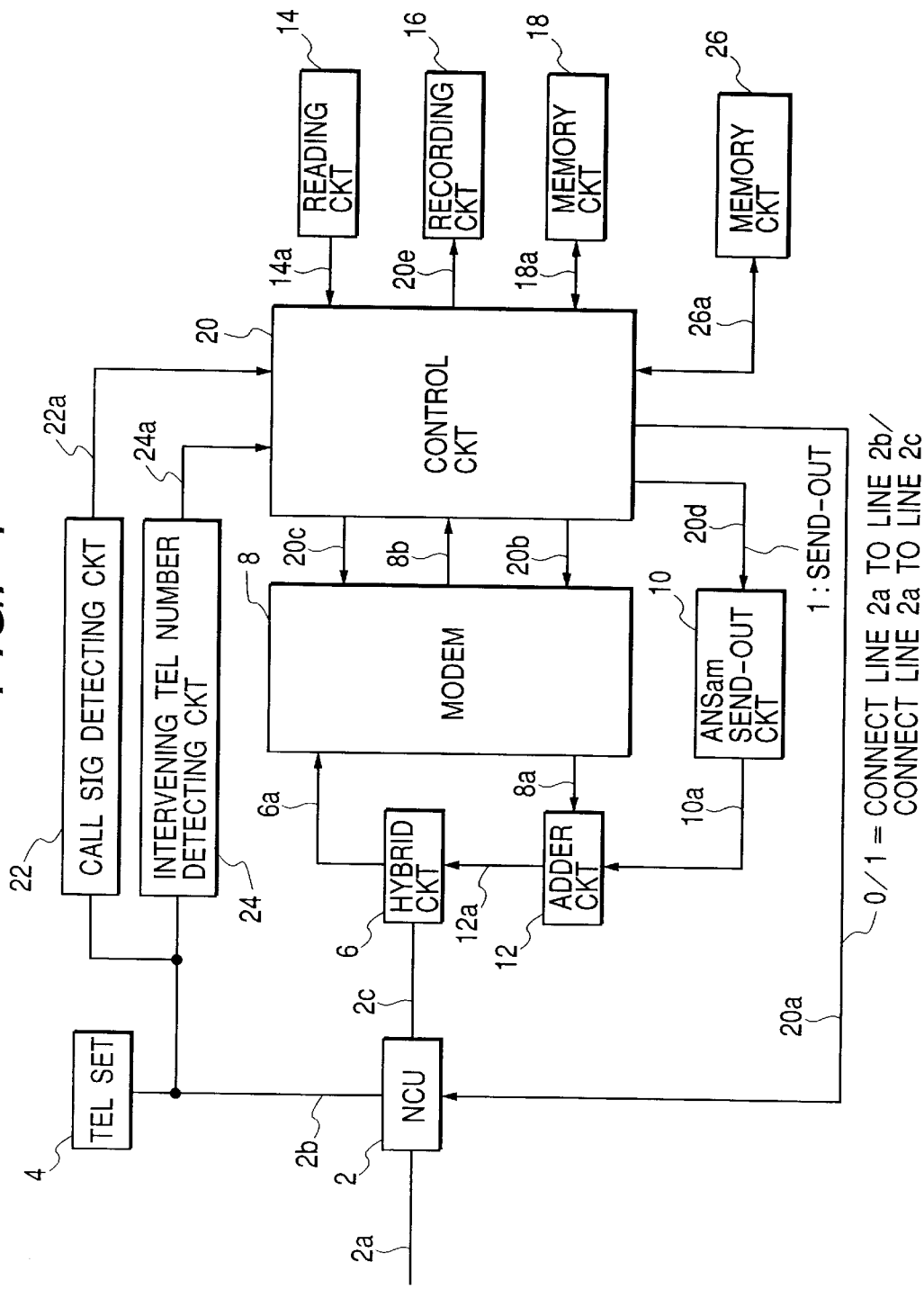
FIG. 1 is a block diagram showing the structure of a facsimile apparatus according to a first embodiment of the invention.

FIG. 1 is a block diagram showing the structure of a facsimile apparatus according to the first embodiment of the invention.

An NCU (network control unit) 2 is connected to a line terminal of a telephone network and performs a connection control to use the telephone network for data communication and the like. NCU 2 switches data communication lines and holds a loop. NCU 2 connects a telephone line 2a to a telephone set 4 if a signal level (signal line 20a) from a control circuit 20 is "0", and connects the telephone line 2a to a facsimile apparatus if the signal level is "1". In a normal state, the telephone line 2a is connected to the telephone set 4.

A hybrid circuit 6 separates a transmission signal and a reception signal. The hybrid circuit 6 sends the transmission signal from an adder circuit 12 via NCU 2 to the telephone line 2a, and receives the reception signal from a partner from NCU 2 to send to a modem 8 via a signal line 6a.

The modem 8 modulates and demodulates signals in accordance with ITU-T Recommendations, V. 8, V. 21, V. 27 ter, V. 29, V. 17, and V. 34. Each transmission mode is designated by a signal on a signal line 20c. The modem 8 receives a signal on a signal line 20b, outputs modulated data to a signal line 8a, receives a reception signal on a signal line 6a, and outputs demodulated data to a signal line 8b.

An ANSam send-out circuit 10 is a circuit for sending an ANSam signal. The ANSam send-out circuit 10 sends the ANSam signal to a signal line 10a when a signal of level "1" is output to a signal line 20d, and it does not send any signal when a signal of level "0" is output to the signal line 20d.

The adder circuit 12 receives information from the signal lines 8a and 10a, and outputs an addition result to the signal line 12a. A reading circuit 14 reads an image of an original and outputs the read image data to a signal line 14a. A recording circuit 16 records information from a signal line 20e sequentially one line after another.

A memory circuit 18 stores raw information of read data, coded information, reception information, decoded information, and the like.

A call signal detecting circuit 22 is a circuit for detecting a call signal from a line. The call signal detecting circuit 22 receives information from the signal line 2b, outputs a signal of level "1" to a signal line 22a when a call signal is detected, and outputs a signal of level "0" to the signal line 22a when the call signal is not detected.

An intervening telephone number detecting circuit 24 is a circuit for detecting an intervening telephone number from a line. This circuit 24 receives information from the line 2b and outputs an intervening telephone number to a line 24a.

A memory circuit 26 is a circuit for storing the number of bytes of FIF of a current DIS, the number of consecutive communication errors, the number of effective bytes of FIF of DIS, respectively for each destination (calling station identified by intervening telephone number). Data is input/output, via a line 26a to/from the memory circuit 26.

A control circuit 20 controls the whole of the facsimile apparatus of this embodiment. In the first embodiment of the invention, the contents of the memory circuit 26 are compared with the partner telephone number detected by the telephone number detecting circuit 24, and in accordance with the comparison result, transmission control is performed by changing the number of bytes of FIF of a transmission signal.

Specifically, if a communication error occurs after a DIS signal having 10 bytes as a default of FIF is sent at reception of a call, it is stored that FIF of the DIS signal of the destination (calling station) is 10 bytes, and if three times of errors occur consecutively, a DIS signal having 7 bytes of FIF is sent to the destination. If a communication error occurs when a DIS signal having 7 bytes of FIF is sent at reception of a call, it is stored that FIF of the DIS signal of the destination is 7 bytes, and if three times of errors occur consecutively, a DIS signal having 4 bytes of FIF is sent.

Figure 2:
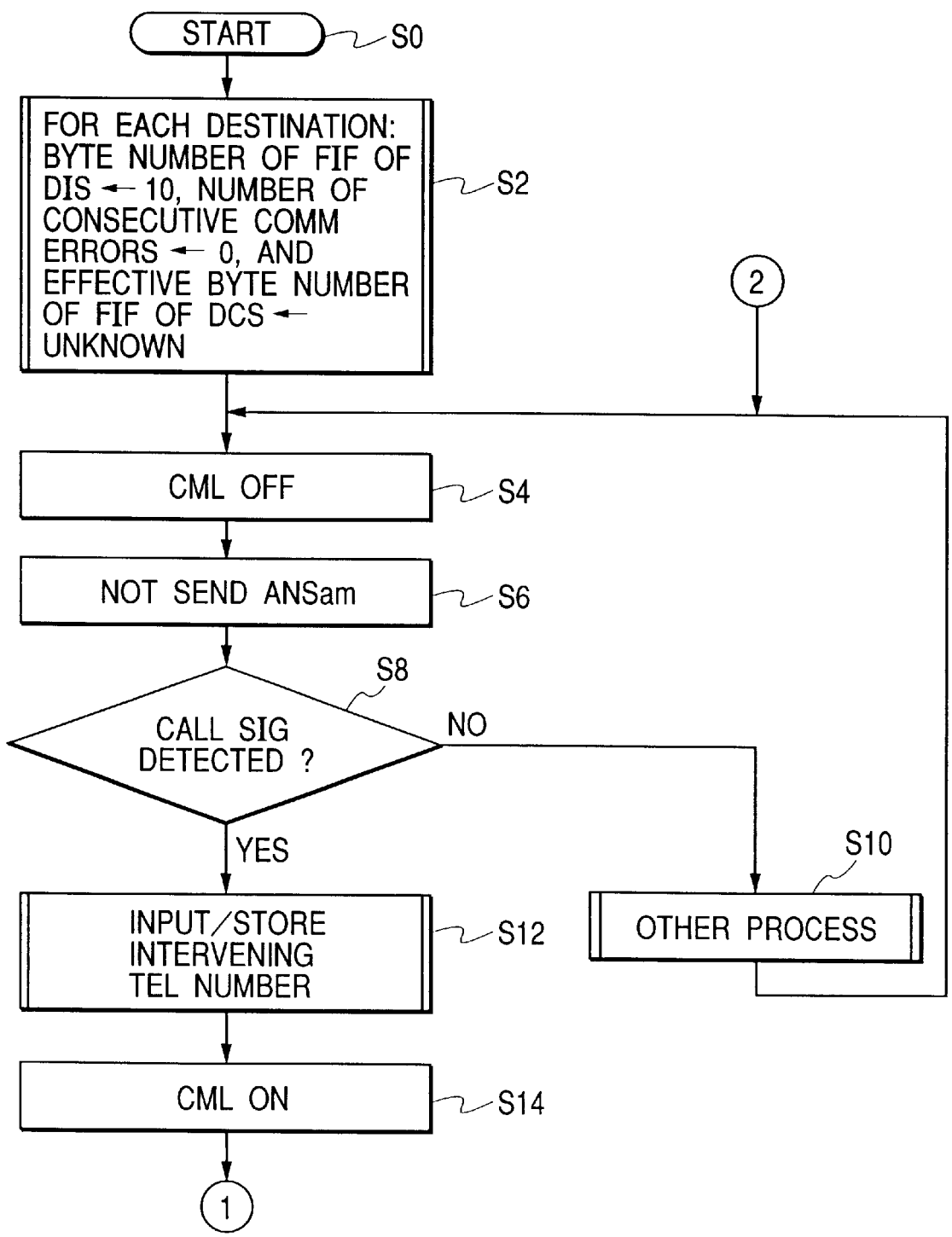
FIG. 2 is a flow chart illustrating the operation of the first embodiment.
Figure 3:
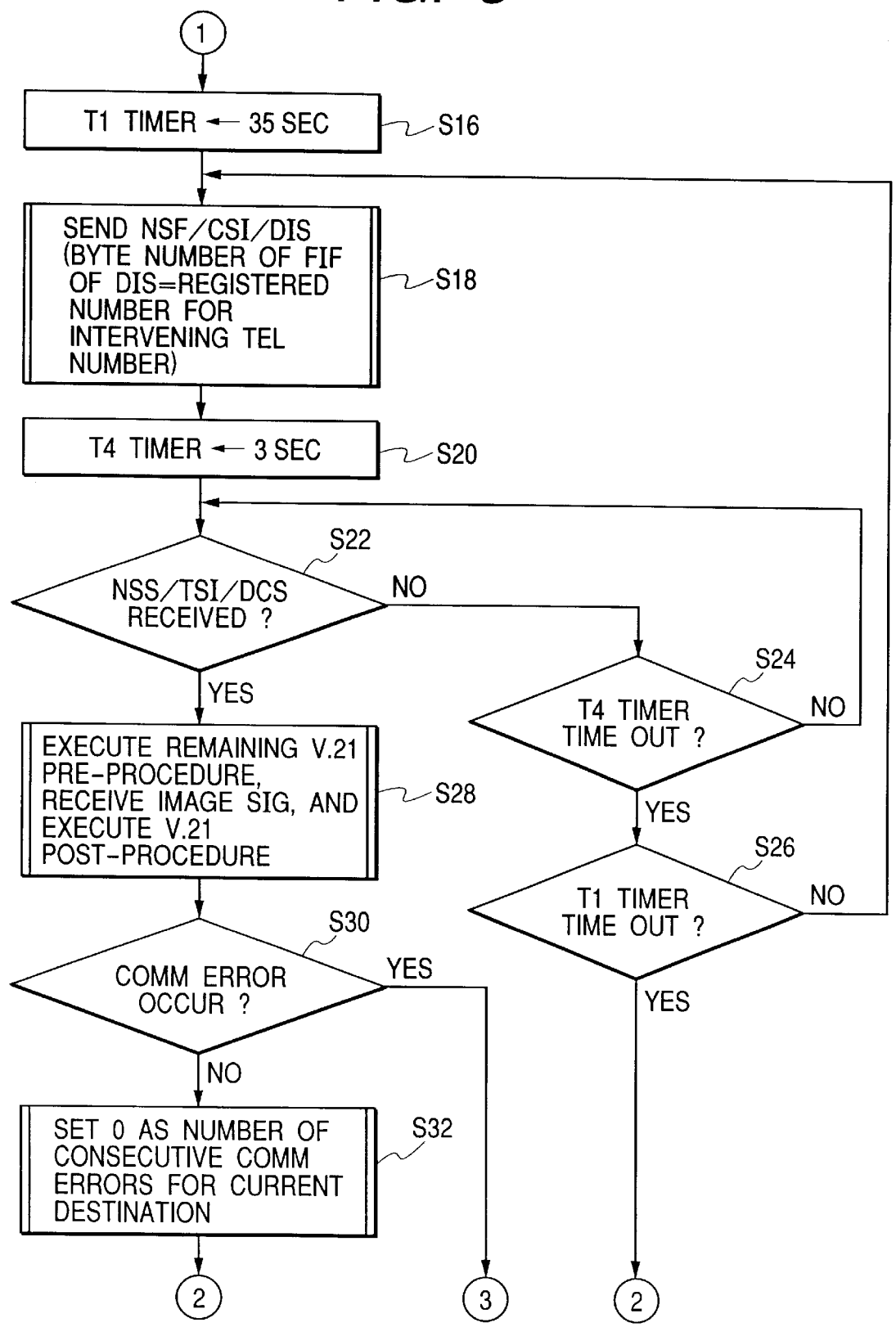
FIG. 3 is a flow chart illustrating the operation of the first embodiment.
Figure 4:
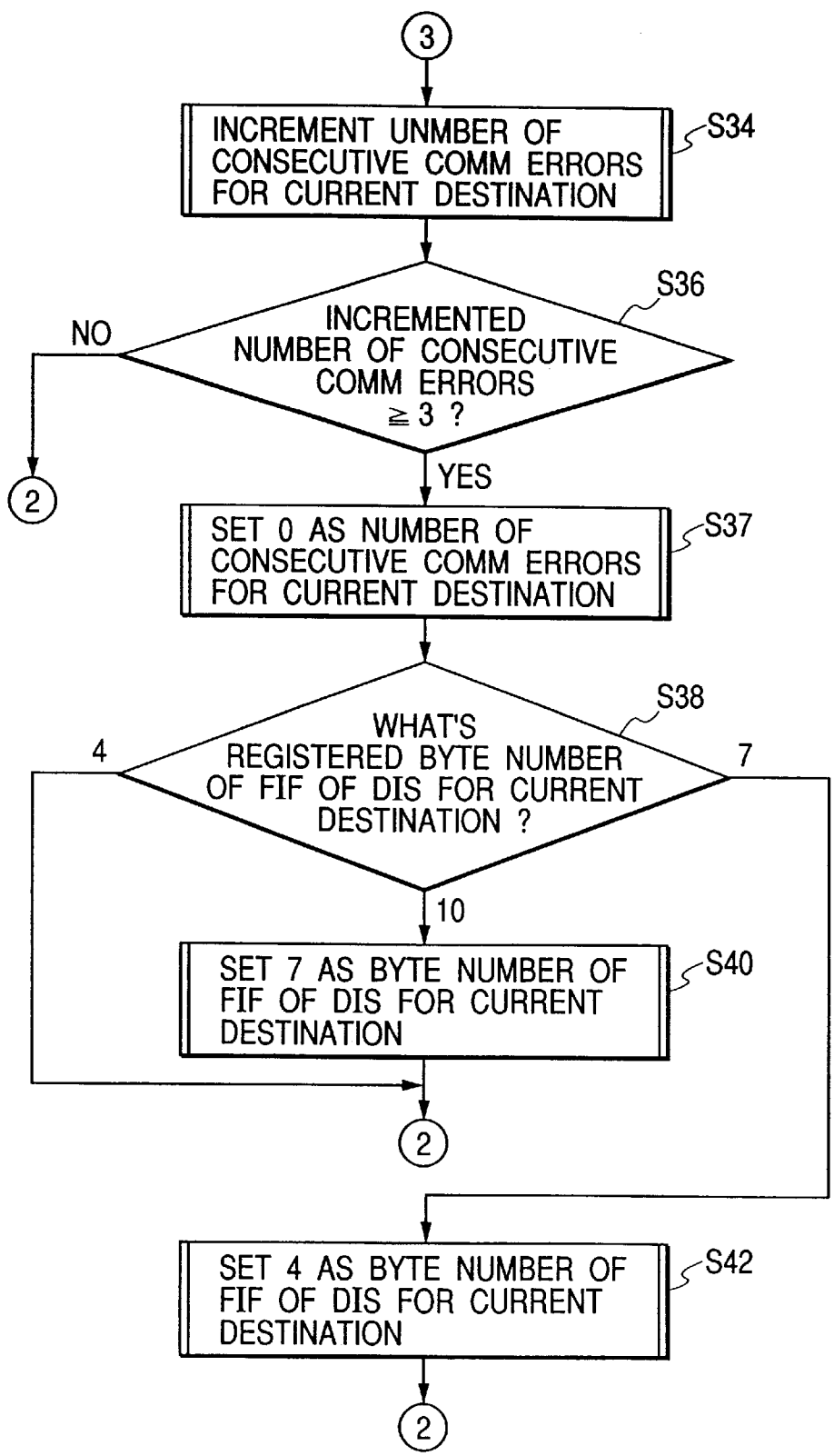
FIG. 4 is a flow chart illustrating the operation of the first embodiment.

FIGS. 2 to 4 are flow charts illustrating the operation of the control circuit 20 according to the first embodiment of the invention.

The control operation starts at S0, and at S2 the number of bytes of FIF of DIS is set to 10, the number of consecutive communication errors is set to 0, and the number of effective bytes of FIF of DCS is set unknown, via the signal line into in the memory circuit 26 for each destination.

At S4 a signal of level "0" is output to the signal line 20a to turn off CML. At S6 a signal of level "0" is output to the signal line 20d so as not to send the ANSam signal.

At S8 information is received from the signal line 22a to check whether the call signal is detected or not. If detected, the flow advances to S12, whereas if not, the flow advances to S10 to perform another process and return to S4.

At S12 the intervening telephone number is input from the signal line 24a and stored. At S14 a signal of level "1" is output to the signal line 20a to turn on CML. At S16 a T1 timer is set to 35 seconds.

At S18 an NSF/CSI/DIS signal of V. 21 is sent. In this case, information is input from the signal line 26a, and the number of bytes of FIF of DIS is set to the value stored in the memory circuit 27 for the corresponding intervening telephone number. At S20 a T4 timer is set to 3 seconds.

At S22 it is checked whether or not the NSS/TSI/DCS signal of V. 21 is received. If received, the flow advances to S28, whereas if not, the flow advances to S24.

At S24 it is checked whether or not the T4 timer is time-out. If time-out, the flow advances to S26, whereas if not, the flow advances to S22.

At S26 it is checked whether or not the T1 timer is time-out. If time-out, the flow advances to S24, whereas if not, the flow advances to S18.

At S28 the remaining pre-procedure of V. 21, image signal reception, and post-procedure of V. 21 are executed. At S30 it is checked whether a communication error occurs. If occurs, the flow advances to S34, whereas if not, the flow advances to S32.

At S32 the number of consecutive communication errors is set to 0 via the signal line 26a into the memory circuit 26 for the current destination, and the flow returns to S4.

At S34 the number of consecutive communication errors is incremented by 1via the signal line 26a into the memory circuit 26 for the current destination. At S36 it is checked whether the number of consecutive communication errors incremented by 1at S34 reaches 3 or larger. If 3or larger, the flow advances to S37, whereas if not, the flow returns to S4.

At S37 the number of consecutive communication errors is set to 0 via the signal line into the memory circuit 26 for the current destination.

At S38 the number of bytes of FIF of the DIS signal stored in the memory circuit 26 for the current destination is checked via the signal line 26a. If the number is 10 bytes, the flow advances to S40 whereat the number of bytes of FIF of the DIS signal is set to 7 into the memory circuit 26 for the current destination, and the flow returns to S4. If the number is 7 bytes, the flow advances to S42 whereat the number of bytes of FIF of the DIS signal is set to 4 into the memory circuit 26 for the current destination, and the flow returns to S4. If the number is 4 bytes, the flow returns to S4.

Second Embodiment

Next, the second embodiment of the invention will be described.

In the second embodiment, the number of bytes of FIF of a DCS signal sent from a partner apparatus in the first embodiment and FIF data are analyzed to determine the minimum number of bytes of FIF of the DIS signal.

Figure 5:
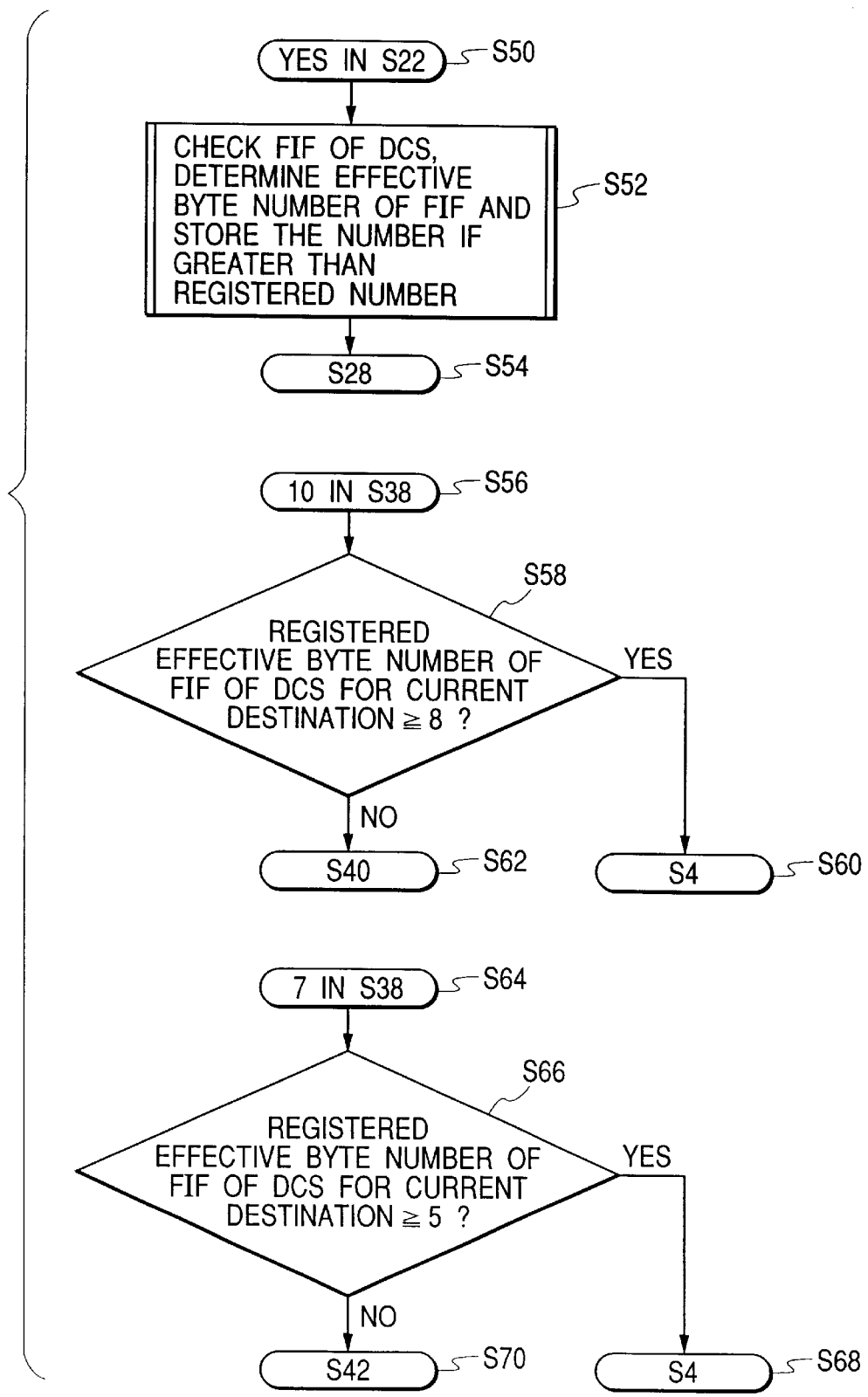
FIG. 5 is a flow chart illustrating the operation of a facsimile apparatus according to a second embodiment of the invention.

FIG. 5 is a flow chart illustrating the operation of the control circuit 20 of the second embodiment, the flow chart showing different portions from the first embodiment (FIGS. 2 to 4). The structure of the apparatus is the same as that of FIG. 1.

Referring to FIG. 5, S50 corresponds to YES at S22. At S52 FIF of the sent DCS is checked to determine effective up to FIF set with "1" excepting extension bits as 6. If the numbering effective bytes is larger than the number of effective bytes of FIF of DCS registered in the memory circuit 26 for the current destination, it is registered, and at S54 the flow returns to S28.

S56 corresponds to S38 when the number of bytes of FIF of the DIS signal registered in the memory circuit 26 for the current destination is 10 bytes.

At S58 information is received from the signal line 26a to check whether the number of effective bytes of FIF of DCS registered in the memory circuit 26 for the current destination is 8 or larger. If 8 or larger, the flow advances to S60 (S54), whereas if not, the flow advances to S62 (S40).

S64 corresponds to S38 when the number of bytes of FIF of the DIS signal registered in the memory circuit 26 for the current destination is 7 bytes.

At S66 information is received from the signal line 26a to check whether the number of effective bytes of FIF of DCS registered in the memory circuit 26 for the current destination is 5 or larger. If 5 or larger, the flow advances to S68 (S4), whereas if not, the flow advances to S70 (S42).

Third Embodiment

In the third embodiment, in a facsimile apparatus having a means for executing transmission by changing the number of bytes of FIF of a transmission signal DIS, if a communication error occurs when a DIS signal having a predetermined number D of bytes (e.g., 10) is sent at reception of a call, a DIS signal having a predetermined number E of bytes (e.g., 4 bytes) of FIF is sent at reception after a predetermined time after the error occurred.

Figure 6:
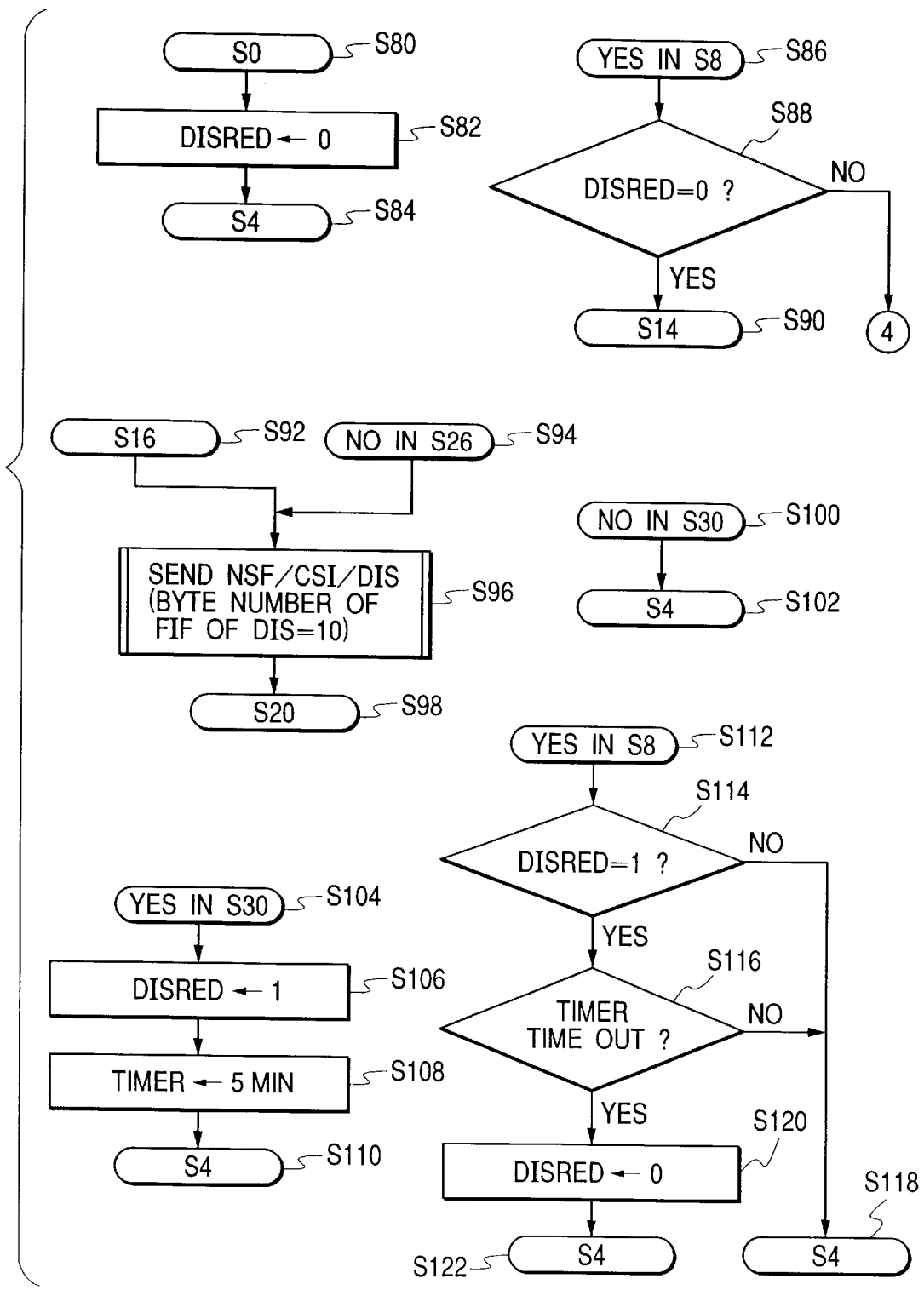
FIG. 6 is a flow chart illustrating the operation of a communication apparatus according to a third embodiment of the invention.
Figure 7:
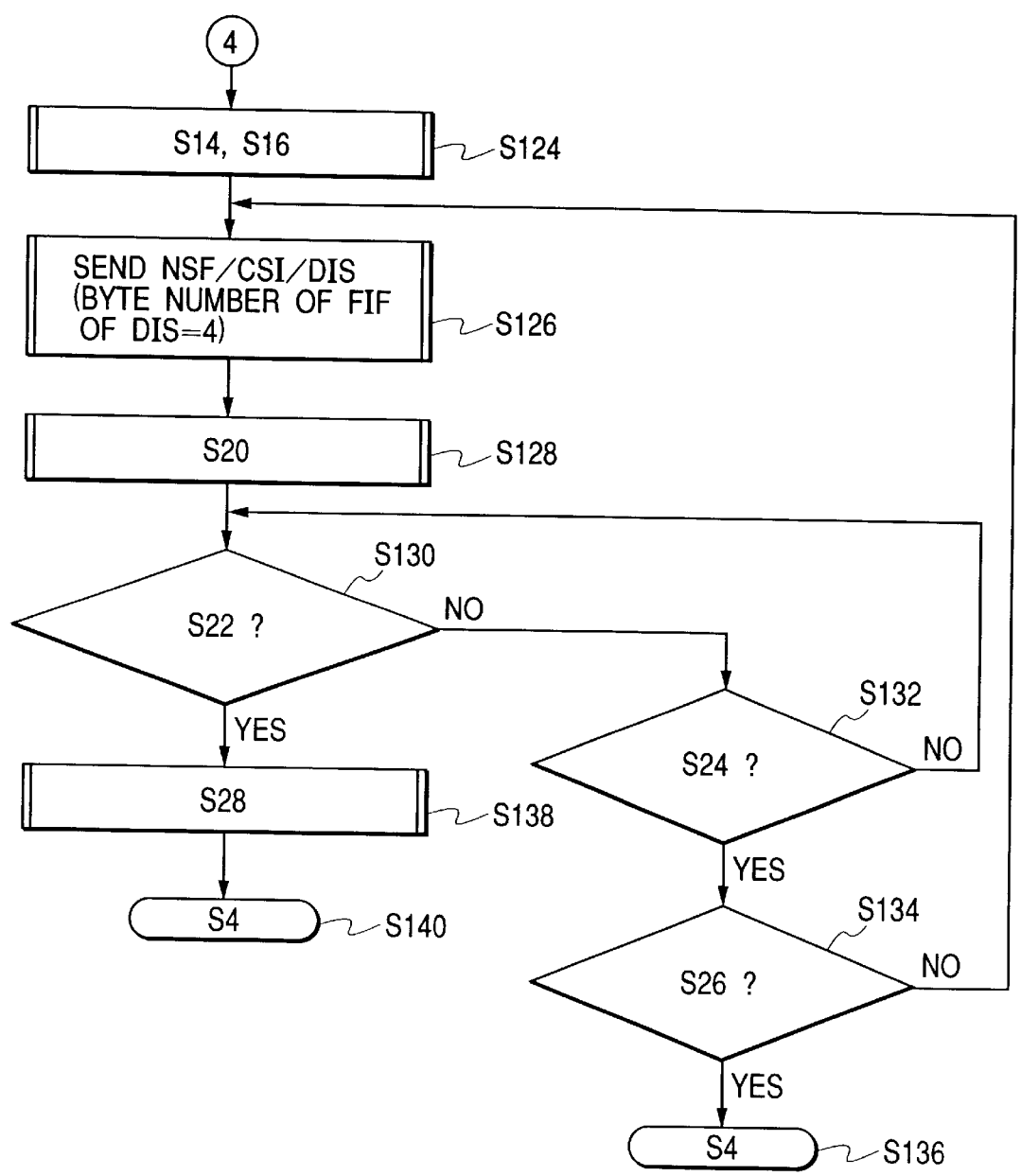
FIG. 7 is a flow chart illustrating the operation of the third embodiment.

FIGS. 6 and 7 are flow charts illustrating the operation of the control circuit 20 of the third embodiment, the flow charts showing different portions from the first embodiment (FIGS. 2 to 4). The structure of the apparatus is the same as that of FIG. 1.

Referring first to FIG. 6, S80 corresponds to S0. At S82 a flag DISRED is cleared. It is assumed that a DIS signal having 4 bytes of FIF is sent if DISRED is "1" and a DIS signal having 10 bytes is sent if DISRED is "0". At S84 the flow returns to S4.

Next, S86 corresponds to YES at S8. At S88 it is checked whether or not the flag DISRED is 0. If 0, the flow advances to S90 (S14), whereas if 1, the flow advances to S124.

S92 corresponds to S16, and S94 corresponds to NO at S26. At S96 an NSF/CSI/DIS signal is sent. It is assumed that the number of bytes of FIF of the DIS signal is 10. At S98 the flow returns to S20.

S100 corresponds to NO at S30. At S102 the flow directly returns to S4. Namely, it means to omit the process of S32.

S104 corresponds to YES at S30. At S106 the flag DISRED is set to "1" and a timer is set to 5 minutes. Thereafter, the flow returns to S4. Namely, the processes from S34 to S42 are not executed.

S112 corresponds to S10. At S114 it is checked whether or not the flag DISRED is "1". If 1, the flow advances to S116, whereas if 0, the flow advances to S118 (S4).

At S116 it is checked whether or not the timer is time-out. If time-out, the flow advances to S120 whereat the flag DISRED is set to "0", and at S122 the flow returns to S4. If not time-out, the flow advances to S118.

S124 corresponds to S14 and S16. Namely, a signal of level "1" is output to the signal line 20a to turn on CML and set the T1 timer to 35 seconds.

At S126 an NSF/CSI/DIS signal is sent. It is assumed herein that the number of bytes of FIF of the DIS signal is 4 bytes.

Next, at S128 the process of S20 is executed. Namely, the T4 timer is set to 3 seconds.

At S130 the judgement at S22 is performed, i.e., it is checked whether the NSS/TSI/DCS signal of V. 21 is received. If received, the flow advances to S138 (S28) whereat the remaining pre-procedure of V. 21, image signal reception, and post-procedure of V. 21 are executed, and at S140 the flow returns to S4.

If it is judged at S130 that the NSS/TSI/DCS signal of V. 21 is not received, the flow advances to S132 (S24) whereat it is checked whether the T4 timer is time-out or not. If time-out, the flow advances to S134 (S26), whereas if not, the flow advances to S130 (S22).

At S134 (S26) it is checked whether the timer T1 is time-out. If time-out, the flow advances to S136 (S4), whereas if not, the flow advances to S126.

The above operation of the control circuit is executed by a CPU in the control circuit in accordance with a program stored in ROM, RAM or the like of the control circuit. The present invention may be reduced in practice by storing such a program in an external storage medium such as a floppy disk, a hard disk, a magnetooptical disk, and a CD-ROM, by reading the program with a dedicated reading apparatus and storing it in the memory of the control circuit, and by executing the program by CPU.

In the above embodiments, a facsimile apparatus of a stand-alone type has been described by way of example. The invention is not limited only thereto, but is also applicable to data communication control of a synthetic data processing system with a communication function combined with a copy function, an electronic file function, and a data processing function. The invention can also be applied to a communication apparatus with separated reading and recording circuits.

As described above, according to the first to third embodiments, reliable communication can be performed between communication apparatuses having different FIF of a DIS signal. It is also possible to provide maximum performances between latest apparatuses using an extended number of bytes of FIF.

According to the second embodiment, even if an older communication apparatus having a smaller number of bytes of FIF of a DIS signal can realize communication with a maximum performance, without limiting the performance of the apparatus.

According to the third embodiment, reliable communication can be performed between communication apparatuses having different bytes of FIF of a DIS signal, through re-dialing.

Fourth Embodiment

The fourth embodiment will be described with reference to FIGS. 8 to 13.

Figure 8:
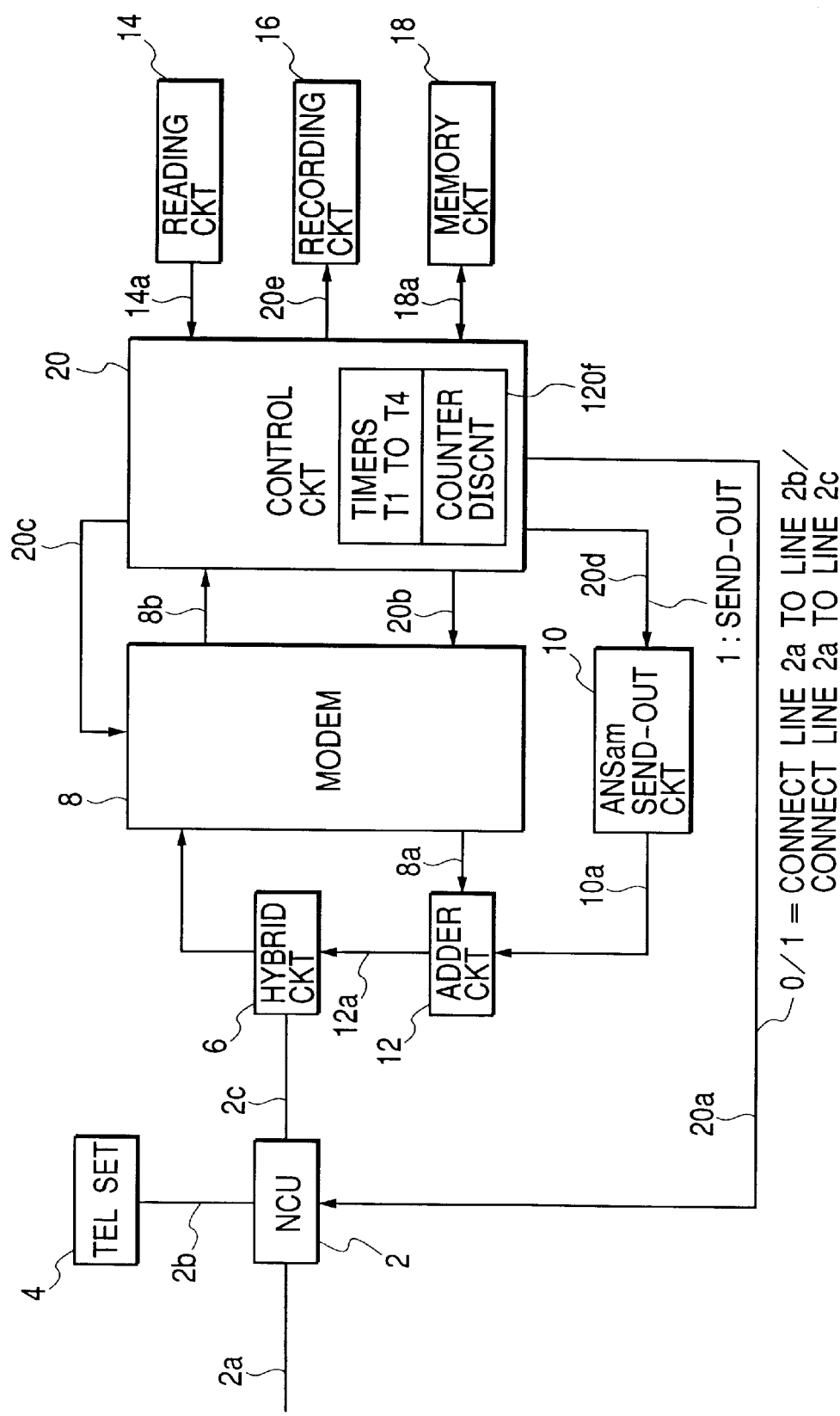
FIG. 8 is a block diagram showing the structure of a facsimile apparatus according to a fourth embodiment of the invention.

FIG. 8 is a block diagram showing the structure of a facsimile apparatus embodying the invention, the facsimile apparatus being provided with two lines. The circuit elements similar to those shown in FIG. 1 are represented by identical reference numerals, and the description thereof is omitted.

Referring to FIG. 8, reference numeral 120 represents a control circuit constituted of a microprocessor, a memory and the like. The control circuit 120 controls the operation of the whole apparatus in accordance with a program, to be described later, stored in an internal memory such as a ROM of the control circuit 120 or a ROM of a memory circuit 18.

It is assumed that the control circuit 120 executes a facsimile communication protocol in conformity with ITU-T Recommendations T30. The control circuit 120 conducts the following control. First, an initial identification signal containing a DIS signal having a length A (e.g., 10 bytes) of FIF is sent. If an effective response signal from the partner cannot be received consecutively a predetermined number C of times (e.g., twice), an initial identification signal containing a DIS signal having a length of a predetermined byte number (e.g., 4 bytes) of FIF is sent. This control of FIF of a DIS signal is executed in generally the same manner even in an intermediate procedure (e.g., when an EOM signal is received) to be executed between pages during a transmission of a plurality of pages.

The control circuit 120 uses timers (T1, . . . ) and a counter (DISCNT) during the communication procedure. These timers and counter (120f in FIG. 8) may be configured by hardware or by software of the control circuit 120. Implementing such timers and counters are well known, and the detailed description thereof is omitted.

The operation of the facsimile apparatus having the above structure will be described in detail with reference to FIGS. 9 to 13. FIGS. 9 to 13 illustrate the sequence of a communication control to be executed by the control circuit 120. The sequence shown in FIGS. 9 to 13 is stored as a program of the control circuit 120 in an internal memory such as a ROM of the control circuit 120 or in a ROM of the memory circuit 18. It is noted that the same numbers in FIGS. 9 to 13 are directly connected thereat.

Figure 9:
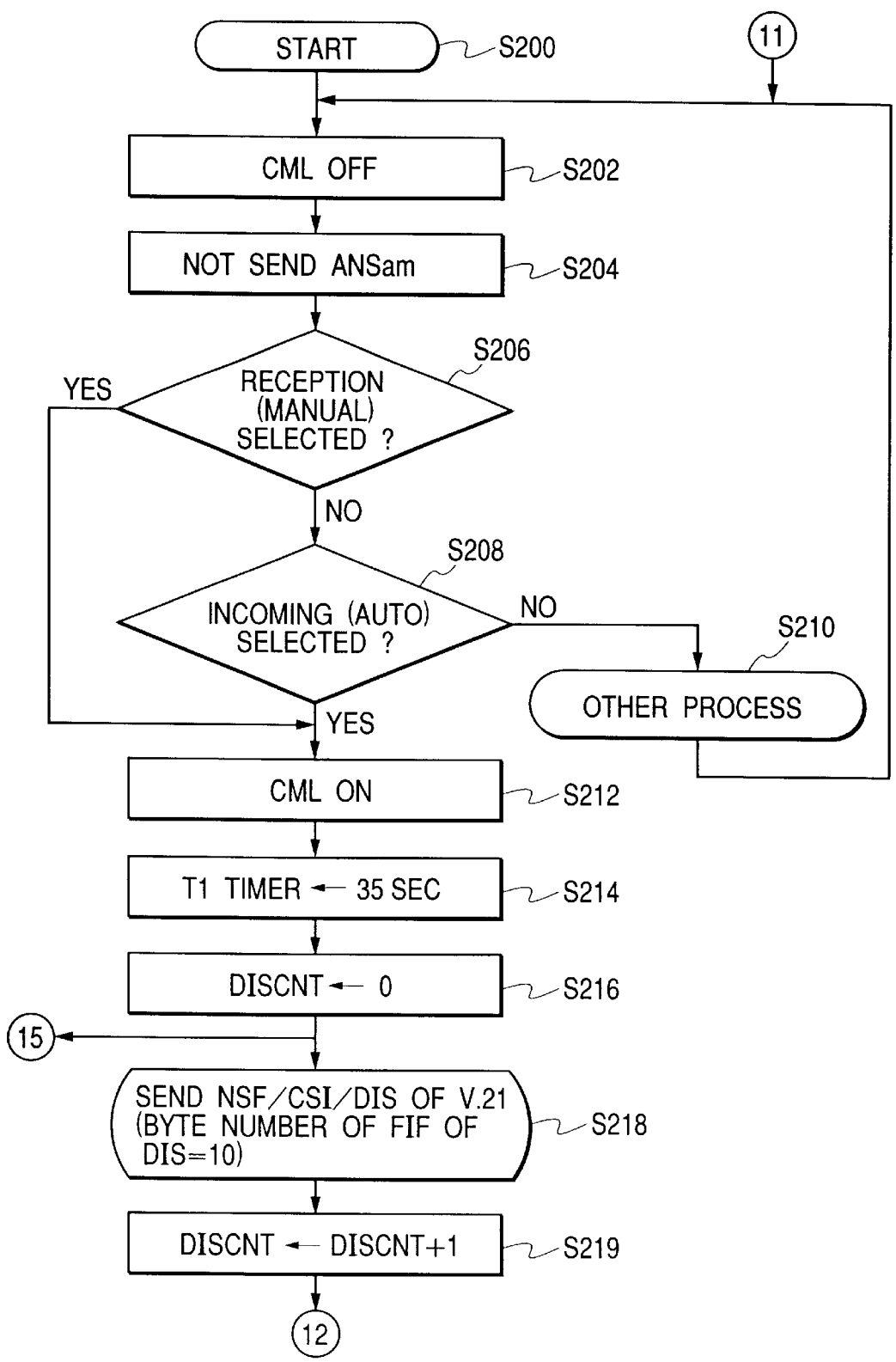
FIG. 9 is a flow chart illustrating a communication control procedure of the apparatus shown in FIG. 8.
Figure 10:
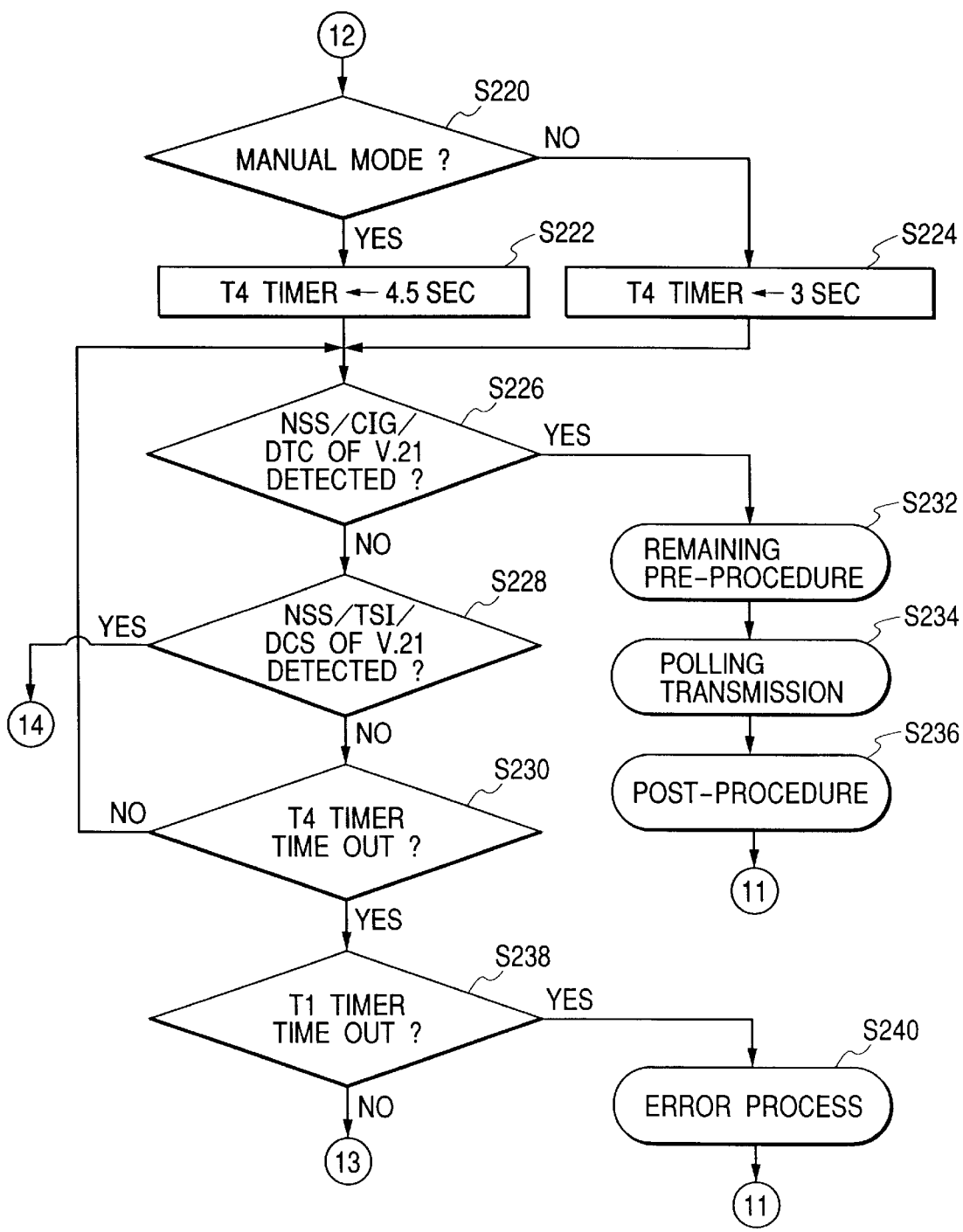
FIG. 10 is a flow chart illustrating a communication control procedure of the apparatus shown in FIG. 8.

Referring to FIG. 9, Step S200 corresponds to a process start such as power-on and reset. At Step S202 a CML relay of NCU 2 is turned off. The line 2a is therefore connected to the telephone set 4.

At Step S204 a signal of level "0" is output to the signal line 20d so as not to send the ANSam signal.

At Step S206 it is checked whether reception (manual) is selected. If selected, the flow advances to Step S212, whereas if not, the flow advances to Step S208. The reception selection at Step S206 is used when a reception start is instructed by manually depressing a start button or the like after the reception.

At Step S208 it is checked whether "incoming" (auto) is selected. If selected, the flow advances to Step S212, whereas if not, the flow advances to Step S210. This incoming selection is used when a call signal is received during an automatic reception mode.

At Step S210 another process is performed such as a known image transmission operation and an original copy operation.

At Step S212, a signal of level "1" is output to the signal line 20a to turn on the CML relay and connect the line 2a to the hybrid circuit 6.

At step S214, the T1 timer is set to 35 seconds (initial identification period).

At Step S216 the counter DISCNT is cleared. This counter DISCNT counts the number of transmissions of a DIS signal having 10 bytes of FIF during the initial identification period.

At Step S218 an NSF/CSI/DIS signal of Recommendation V. 21 (300 bps) is sent. It is assumed that the number of bytes of FIF of the DIS signal sent at Step S218 is 10 bytes. Transmission/reception of a procedure signal is performed via the modem 8.

At Step S219 the value of the counter DISCNT is incremented by 1.

At Step S220 (FIG. 10) it is checked whether the apparatus is in the manual mode. If in a manual mode, the flow advances to Step S222, whereas if not, the flow advances to Step S224.

At Step S222 the timer T4 is set to 4.5 seconds, and at Step S224, it is set to 3 seconds.

Steps S226, S228, and S230 constitute a loop having a period set by the timer T4. At Step S226 it is checked whether the NSS/CIG/DTC signal of Recommendation V. 21 is received. At Step S228 it is checked whether the NSS/TSI/DCS signal is received.

Figure 11:
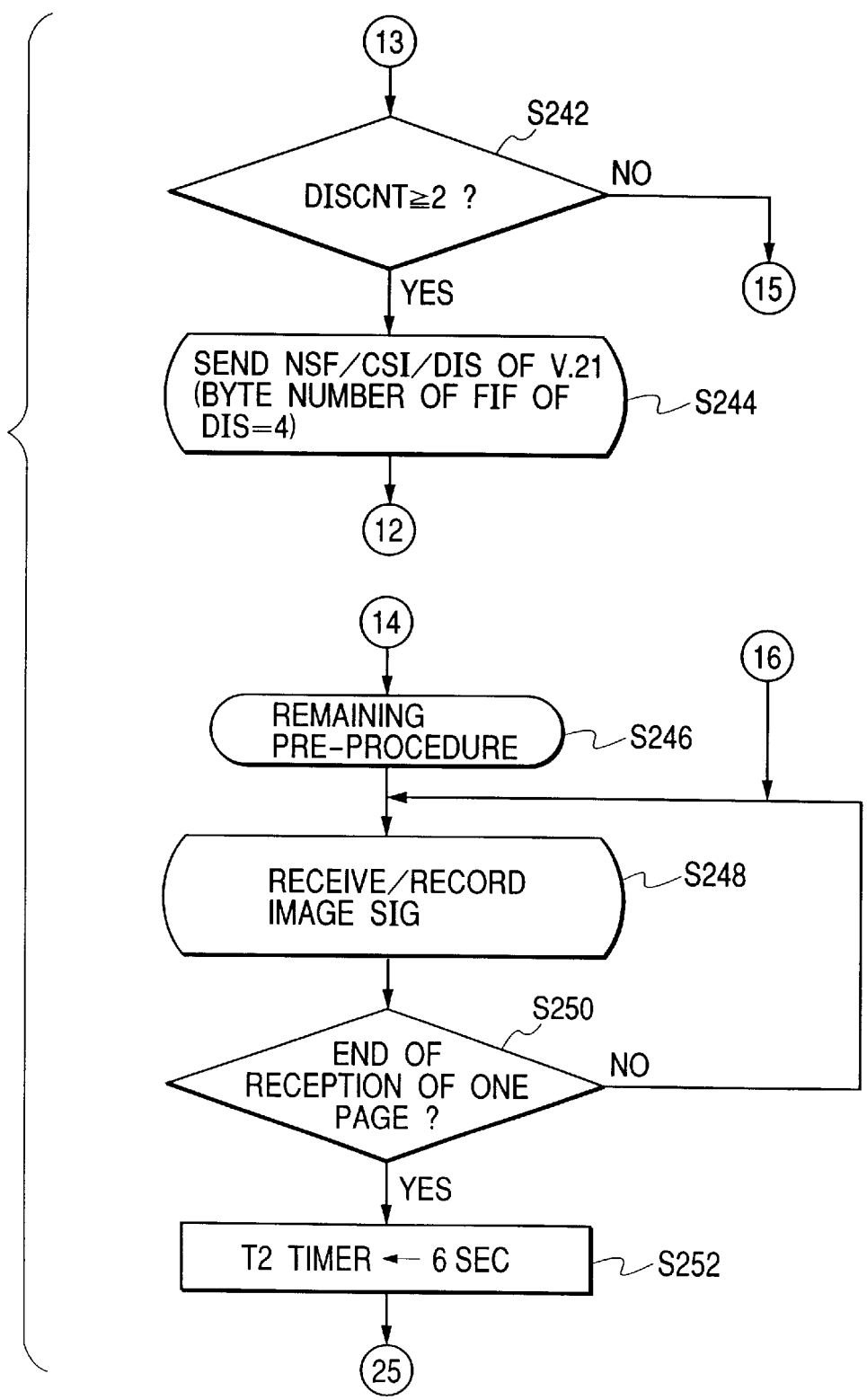
FIG. 11 is a flow chart illustrating a communication control procedure of the apparatus shown in FIG. 8.

If the NSS/CIG/DTC is received, the flow advances to Step S232, whereas if the NSS/TSI/DCS signal is received, the flow advances to Step S246 (FIG. 11). Reception of these signals continues until the timer T4 becomes time-out at Step S230. When the timer T4 becomes time-out, the flow advances to Step S238.

At Steps S232, S234, and S236 in response to a reception of the NSS/CIG/DTC signal, the remaining pre-procedure, polling image transmission, and post-procedure are executed.

At Step S238 it is checked whether the timer T1 is time-out, indicating the end of the initial identification period. If the initial identification period is passed, the flow advances to Step S240 whereat an error process is executed, whereas if not, the flow advances to Step S242 (FIG. 11).

At Step S242 it is checked whether the value of the counter DISCNT is 2 or larger. If 2 or larger, the flow advances to Step S244, whereas if not, the flow advances to Step S218.

If the counter DISCNT is 2 or larger, it should be judged that the DIS signal having 10 bytes of FIF and first sent is not recognized by the partner apparatus. Therefore, at Step S244, the NSF/CSI/DIS signal of V. 21 Recommendation is sent. At this Step S244 it is assumed that the length of FIF of the DIS signal is 4 bytes and the format of a conventional DIS signal is used.

If the NSS/TSI/DCS signal is received at Step S228 (FIG. 10), the remaining pre-procedure is executed at Step S246 (FIG. 11), and the image reception and image recording by the recording circuit 16 are executed at Step S248.

At Step S250 it is checked whether image reception of one page is completed. If completed, the flow advances to Step S252, whereas if not, the flow returns to Step S248 to repeat the image reception and recording.

Figure 12:
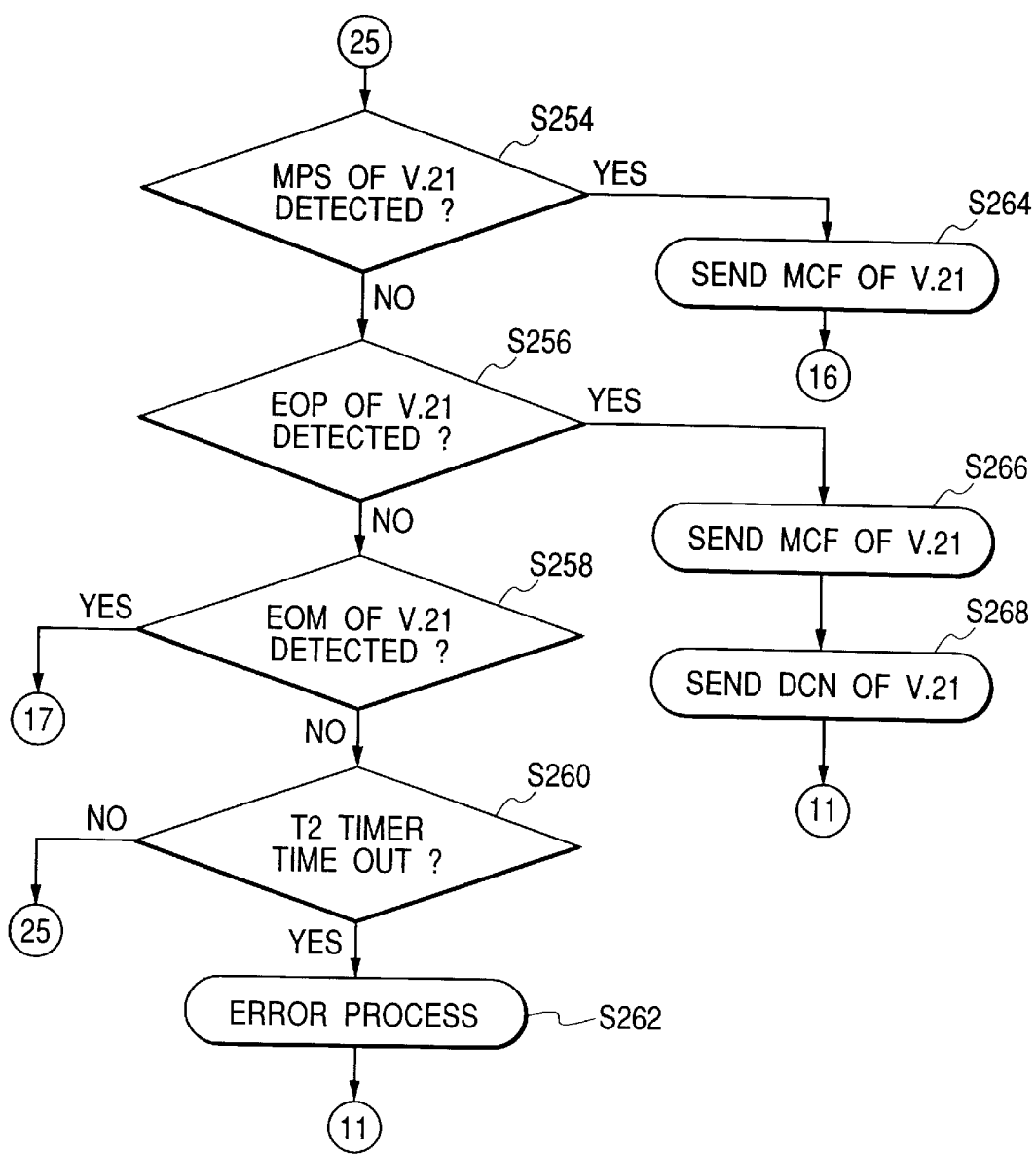
FIG. 12 is a flow chart illustrating a communication control procedure of the apparatus shown in FIG. 8.

At Step S252 the timer T2 is set to 6 seconds and thereafter the flow advances to Step S254 (FIG. 12).

Steps S254, S256, S258, and S260 constitute a loop having a period of 6 seconds set by the timer T2. It is checked at Step S254 whether an MPS (multi page) signal of V. 21 Recommendation is detected, it is checked at Step S256 whether an EOP (procedure end) signal of V. 21 Recommendation is detected, and it is checked at Step S258 whether an EOM (end of message) signal of V. 21 Recommendation is detected. If the time T2 has counted 6 seconds at Step S260, it means a preset procedure signal is not received between pages, so that an error process is executed at Step S262. If the timer T2 has not counted 6 seconds at Step S260, the flow returns to Step S254.

If the MPS signal is received at Step S254, an MCF signal indicating an acknowledge of multi-page reception is sent at Step S264.

If the EOP signal is received at Step 256, an MCF signal indicating an acknowledge of the procedure end is sent at Step S266 and a DCN signal is sent at Step S268 to disconnect the call.

Figure 13:
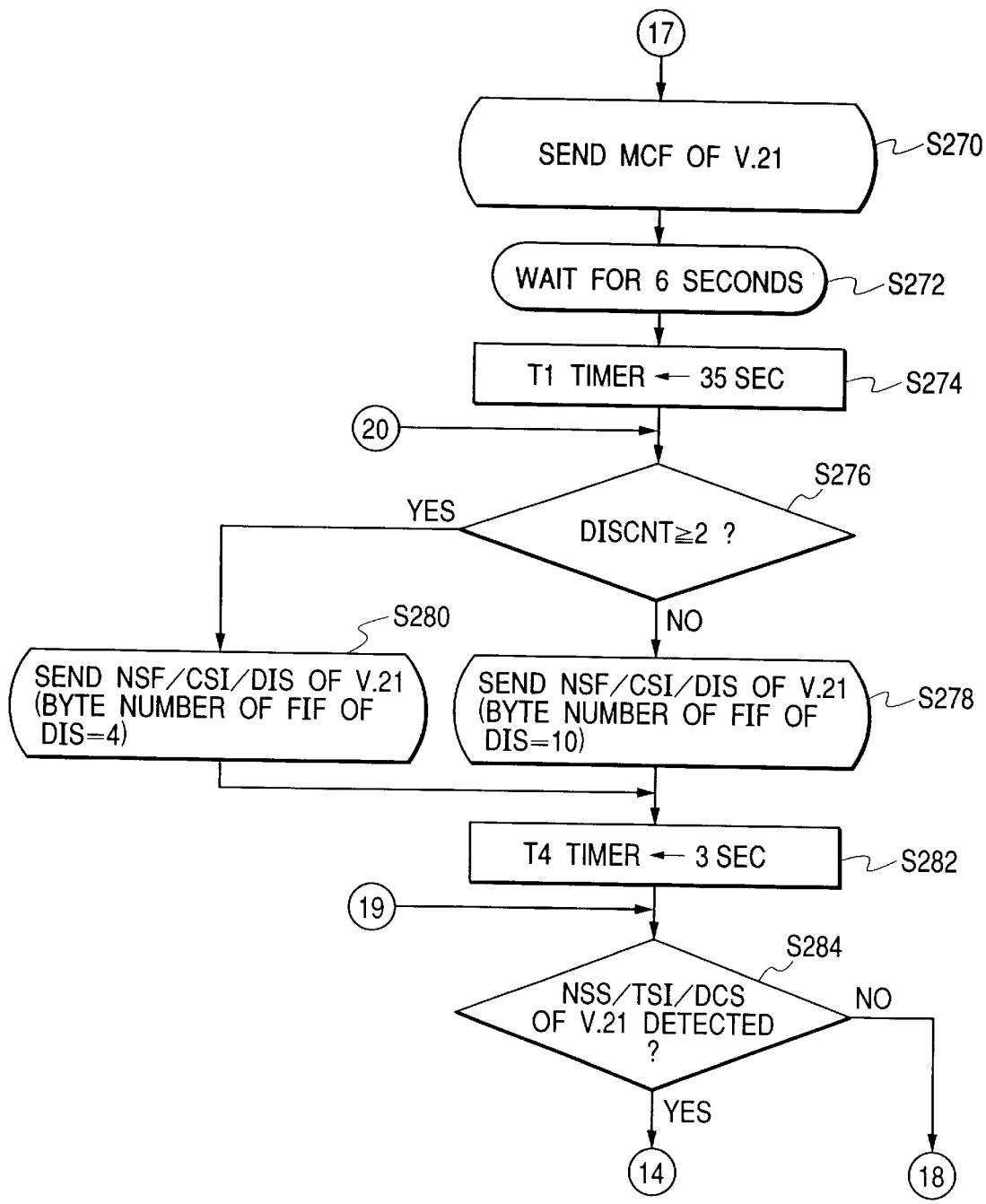
FIG. 13 is a flow chart illustrating a communication control procedure of the apparatus shown in FIG. 8.

If the EOM signal is received at Step S258, the flow advances to Step S270 shown in FIG. 13 to execute a multi page reception process. First, at Step S270 the MCF signal is sent, the operation enters a standby state for 6 seconds at Step S272, the timer T1 is set to 35 seconds to again set the initial identification period at Step S274, and at Step S276 it is checked whether the count of the counter DISCNT set in the pre-procedure is 2 or larger.

If 2 or larger at Step S276, the flow advances to Step S280 whereat the number of bytes of FIF of the DIS signal is set to 4 bytes and the NSF/CSI/DIS signal of V. 21 Recommendation is sent, whereas if not, the flow advances to Step S278 whereat the number of bytes of FIF of the DIS signal is set to 10 bytes and the NSF/CSI/DIS signal of V. 21 Recommendation is sent.

Figure 14:
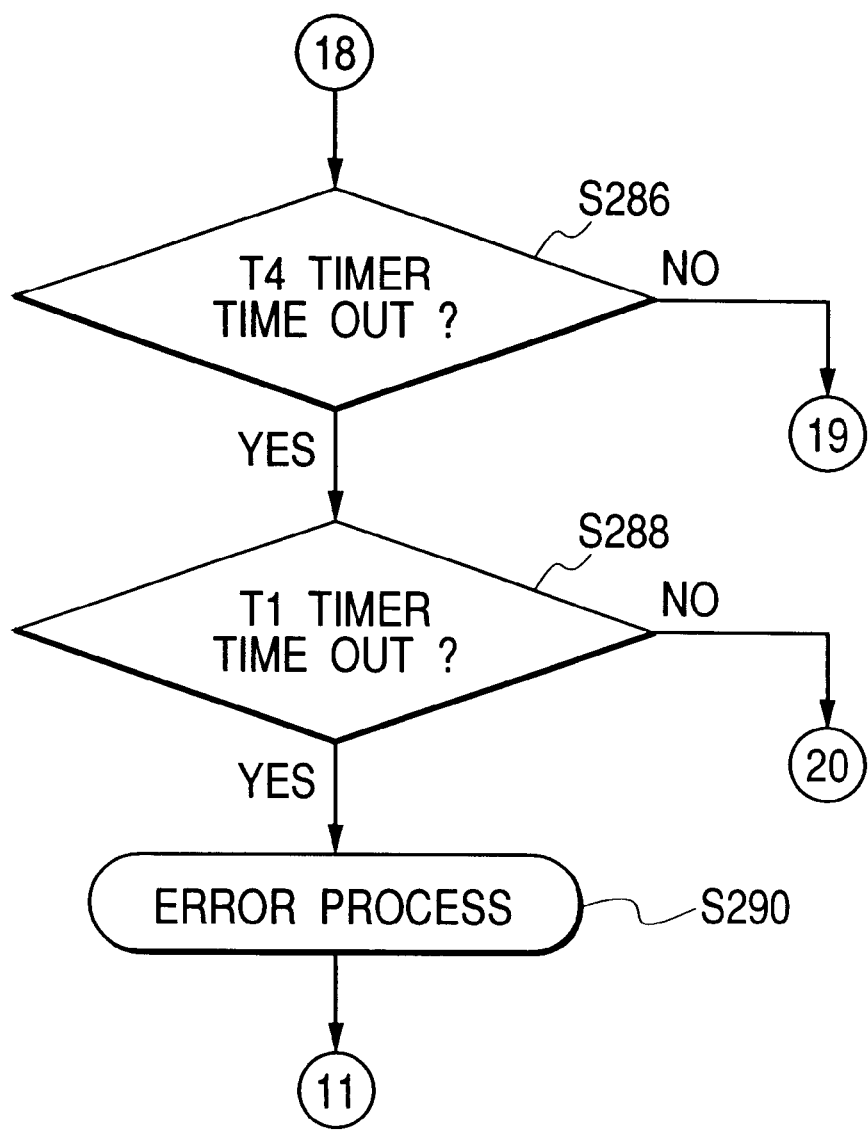
FIG. 14 is a flow chart illustrating a communication control procedure of the apparatus shown in FIG. 8.

At Step S282 the timer T4 is set to 3 seconds, and it is checked at Step S286 whether the NSS/TSI/DCS signal is detected. If detected, the flow returns to Step S246 (FIG. 11) to receive the next page, and if the next page cannot be received, the flow advances to Step S286 (FIG. 14).

At Step S286 (FIG. 14) it is checked whether the timer T4 is time-out. If not, the flow returns to Step S284 whereat the NSS/TSI/DCS signal is waited for, whereas if time-out, the flow advances to Step S288.

At Step S288 it is checked whether the timer T1 (35 seconds) is time-out (over the initial identification period between pages). If the timer T1 becomes time-out without receiving the effective response signal, an error process is executed at Step S290. If the timer T1 is not time-out, the flow returns to Step S276 (FIG. 13) to repeat the above operation.

As described above, according to the fourth embodiment, the initial identification signal containing a DIS signal having a length A (e.g., 10 bytes) of FIF is sent, and if the effective response signal from the partner apparatus is not consecutively received a plurality number C of times (e.g., twice), the initial identification signal containing a DIS signal having a predetermined number B of bytes (e.g., 4 bytes) of FIF is sent. Accordingly, communication with even an older facsimile apparatus of a partner having the predetermined number B (four) of bytes can be made, initial identification can be made reliably although the communication time is prolonged more or less, and a failure in image communication becomes less.

A DIS signal having a large number of bytes of FIF is first used, and if the communication can be established, this procedure becomes effective. Accordingly, if the partner apparatus has an extended number of bytes of FIF, image communication of high quality can be made by using the extended number of bytes of FIF without losing a chance of call connection.

In the fourth embodiment, when the EOM signal is received at Step S258 shown in FIG. 12, the length of FIF of a DIS signal is determined by using the count of the counter DISCNT set in the pre-procedure. Accordingly, the intermediate procedure can be executed reliably by using a compatible DIS signal without using time wastefully in the intermediate procedure.

In the above embodiment, the length of FIF of a DIS signal is controlled. It is obvious that FIF of another procedure signal can be controlled by using similar techniques. In the above embodiment, the facsimile apparatus having the reading and recording circuits is described by way of example. It is obvious that the same configuration as the embodiment can be applied to a digital copier having a facsimile communication function, a FAX modem and a facsimile system made of a combination of a FAX modem, a computer, a word processor, a printer and the like.

Fifth Embodiment

Figure 15:
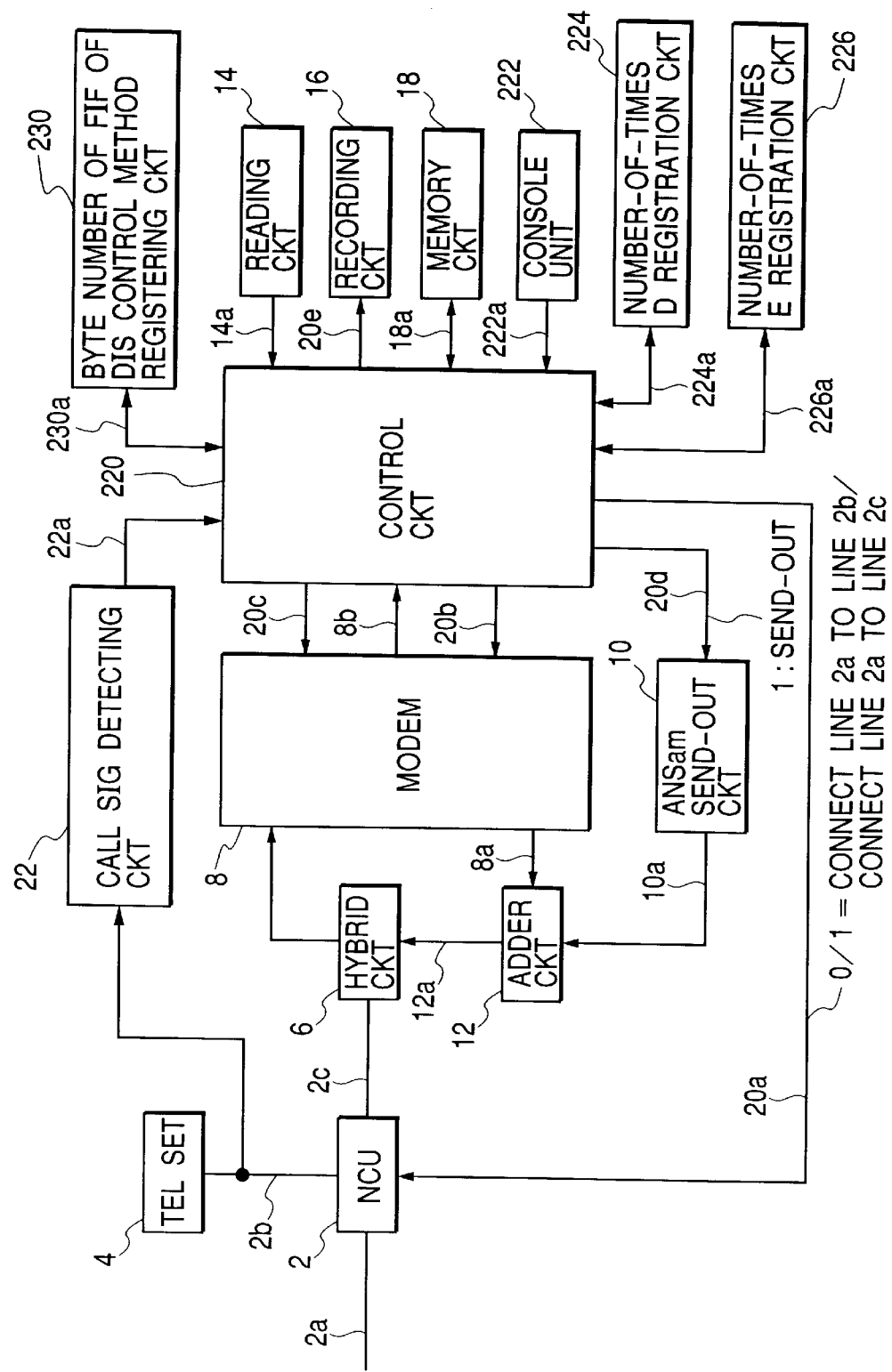
FIG. 15 is a block diagram showing the structure of a facsimile apparatus according to a fifth embodiment of the invention.

FIG. 15 is a block diagram showing the structure of a facsimile apparatus according to the fifth embodiment of the invention. Like elements to those shown in FIG. 1 are represented by using identical reference numerals, and the description thereof is omitted.

A console unit (operation unit) 222 has a one-touch dial, abbreviated dial, ten-keys, an * key, a # key, a set key, a start key, a registration key for registration circuits 224, 226, and 230, other function keys, and the like. Key information of a depressed key is output to a signal line 222a from the console unit 222.

The registration circuit 224 registers a predetermined number D of times. In the sixth embodiment to be described later, the predetermined number D of times is set to 2, in the seventh embodiment to be described later, the predetermined number D of times is set to 3 for the automatic mode, and 2 for the manual mode, and in the eighth embodiment to be described later, the predetermined number D of times is set to 2 with the CSI signal, and 3 without the CSI signal.

The registration circuit 226 registers a predetermined number E of times. In the sixth embodiment to be described later, the predetermined number E of times is set to 4, in the seventh embodiment the predetermined number E of times is set to 5, and in the eighth embodiment the predetermined number E of times is set to 3 with the CSI signal, and 4 without the CSI signal.

The registration circuit 230 is a circuit for registering a method of controlling the number of bytes of FIF of a DIS signal. If a pre-procedure error occurs after a DIS signal having 10 bytes of FIF is sent, whether a DIS signal having 4 bytes of FIF is sent only at the next reception, or at the reception after a predetermined lapse of time (e.g., 20 minutes) is registered via a signal line 230a.

A control circuit 220 controls the whole of the facsimile apparatus. In the fifth embodiment of the invention, the control circuit 220 operates in the following manner. If a CM signal is received from the partner apparatus after an ANSam signal is sent at the reception, the number of bytes of FIF of a DIS signal at the following reception is set to a predetermined byte number A. If the CM signal is not received from the partner apparatus, a DIS signal having the predetermined number A of V. 21 is sent, and if the effective response signal from the partner apparatus cannot be received consecutively by a predetermined number C of times, a DIS signal having a predetermined byte number B of V. 21 is sent.

Further, if the CM signal from the partner apparatus is detected after the ANSam signal is sent or if a CI signal of V. 8 is received after a DIS signal having the predetermined byte number A of V. 21 is sent, and if the control is shifted to the protocol sequence of V. 34, then a DIS signal having the predetermined byte number A is always sent. In this embodiment, it is assumed that the predetermined byte number A is 10 bytes, the predetermined byte number B is 4 bytes, and the predetermined number C of times is 2 bytes.

FIGS. 16 to 20 are flow charts illustrating the control of the control circuits 220 according to the fifth embodiment of the invention.

Figure 16:
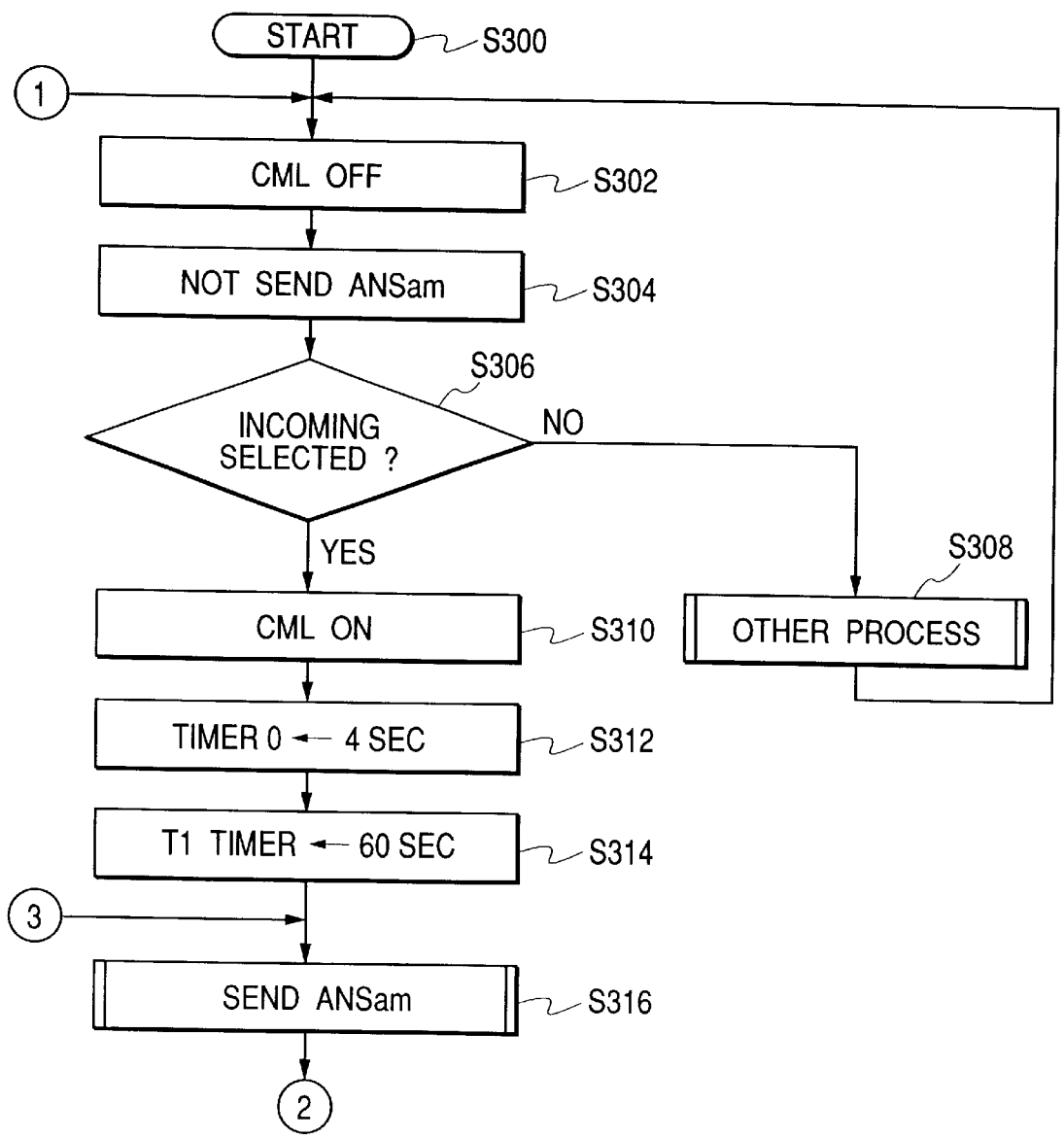
FIG. 16 is a flow chart illustrating the operation of the apparatus of the fifth embodiment.
Figure 17:
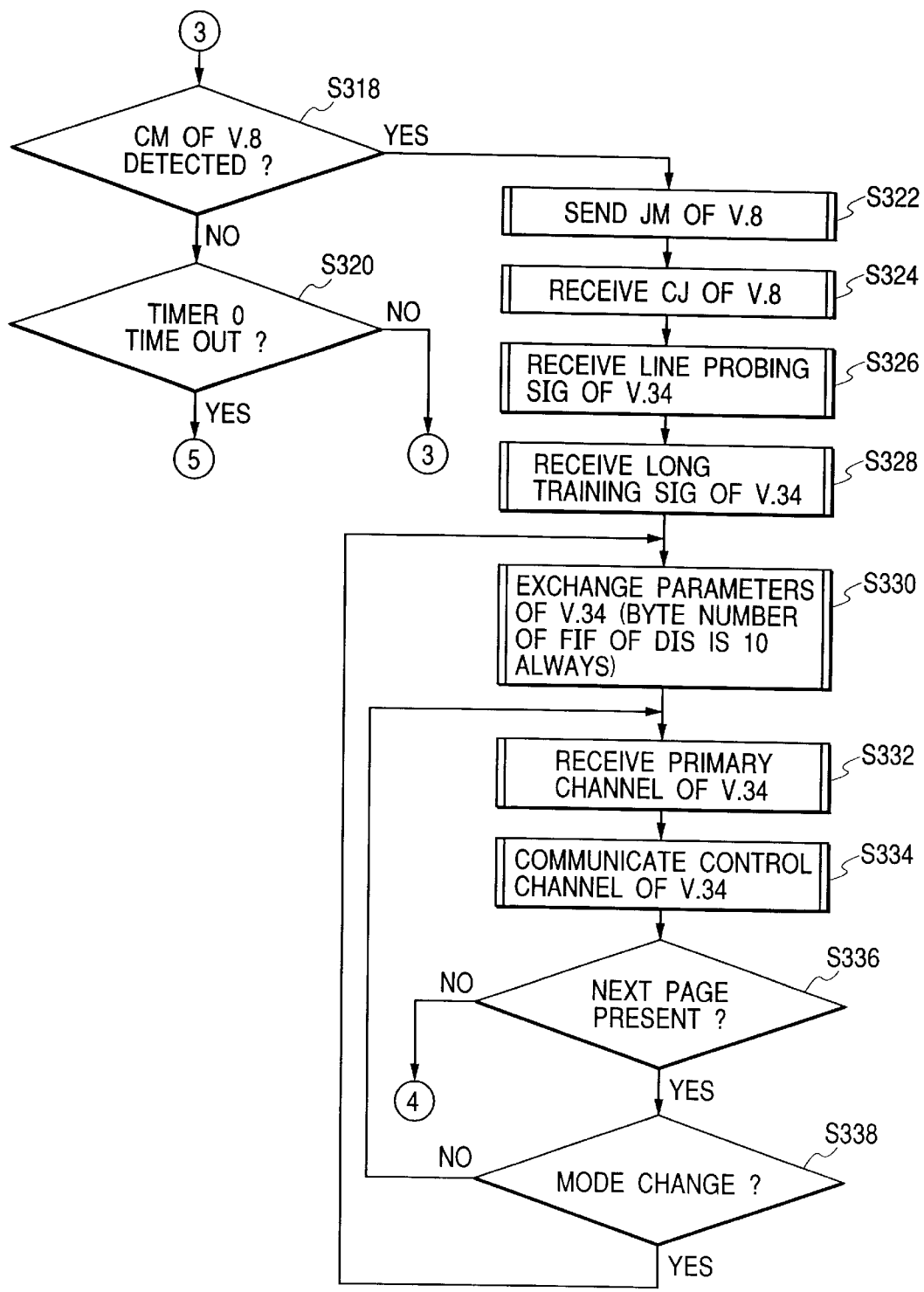
FIG. 17 is a flow chart illustrating the operation of the apparatus of the fifth embodiment.
Figure 18:
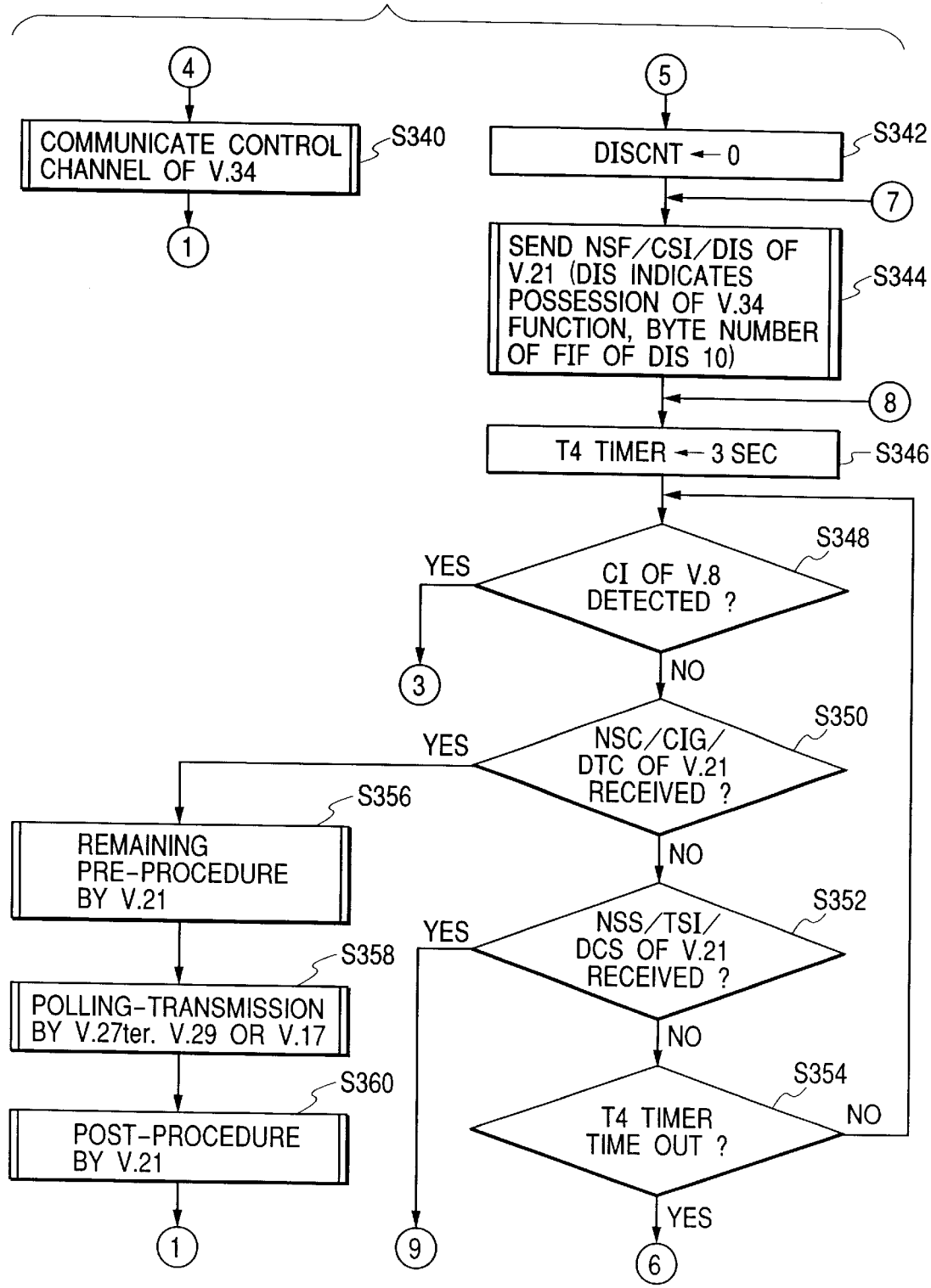
FIG. 18 is a flow chart illustrating the operation of the apparatus of the fifth embodiment.
Figure 19:
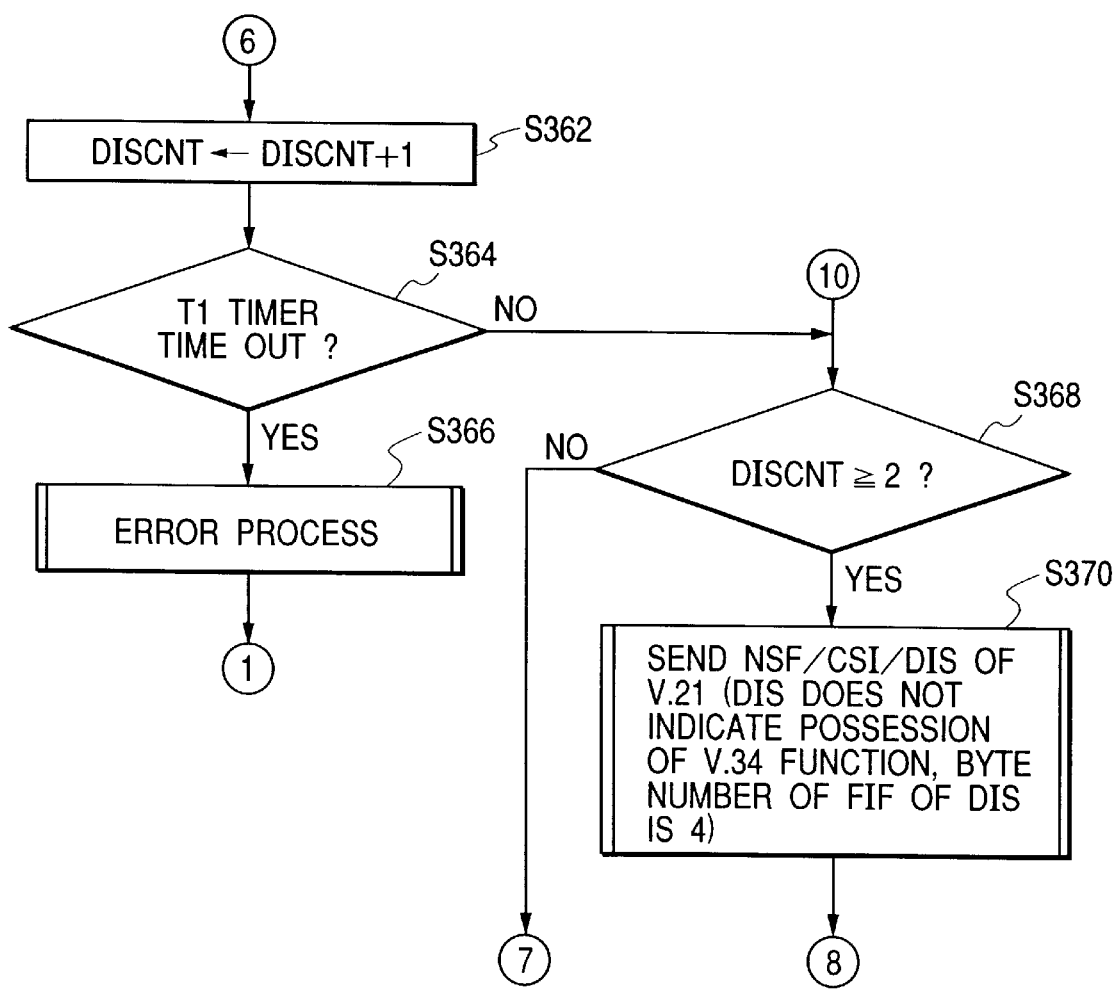
FIG. 19 is a flow chart illustrating the operation of the fifth embodiment.
Figure 20:
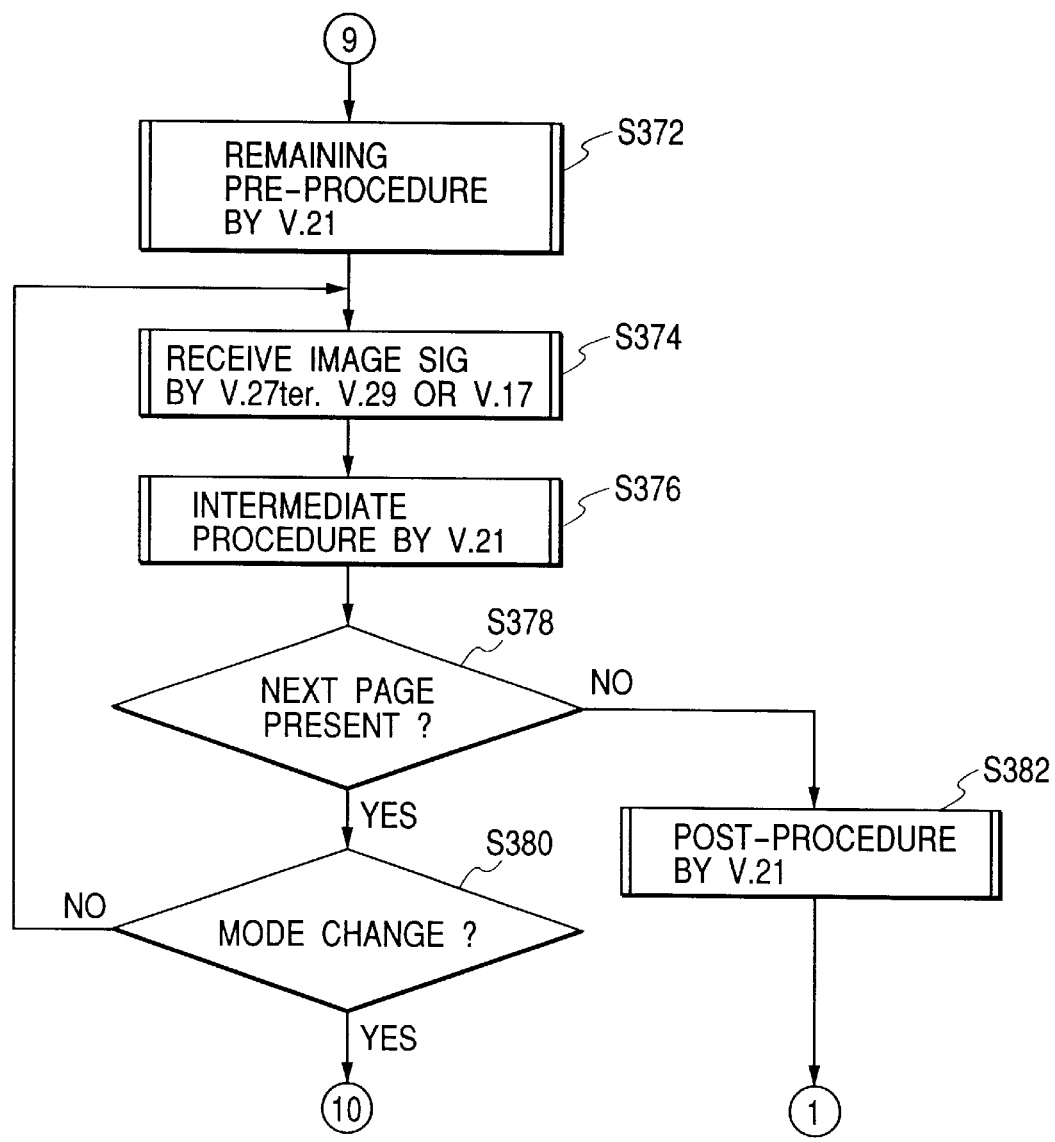
FIG. 20 is a flow chart illustrating the operation of the apparatus of the fifth embodiment.

Referring to FIG. 16, the operation starts at S300. At S302 a signal of level "0" is output to the signal line 20a so as not to send the CML signal. At S304 a signal of level "0" is output to the signal line 20d so as not to send the ANSam signal.

At S306 it is checked whether the incoming (auto) is selected. If selected, the flow advances to S310, whereas if not, the flow advances to S308 to execute another process and return to S302.

At S310 a signal of level "1" is output to the signal line 20a to send the CML signal. At S312, a timer T0 is set to 4 seconds. At S314 a timer T1 is set to 60 seconds.

At S316 the ANSam signal is sent, and at S318 (FIG. 17) it is checked whether the CM signal of V. 8 is detected. If detected, the flow advances to S322, whereas if not, the flow advances to S320.

At S320 it is checked whether the time T0 is time-out. If time-out, the flow advances to S342, whereas if not, the flow advances to S316.

At S322 a JM signal of V. 8 is sent, at S324 a CJ signal of V. 8 is received, at S326 a line probing signal of V. 34 is received, and at S328 a long training signal of V. 34 is received.

At S330 parameters of V. 34 are exchanged. In this case, a DIS signal having 10 bytes of FIF is always sent. At S332 a primary channel of V. 34 is received, and at S334 communication of a control channel of V. 34 is executed.

At S336 it is checked whether there is a next page. If there is a next page, the flow advances to S338, whereas if not, the flow advances to S340.

At S338 it is checked whether there is a mode change. If there is the mode change, the flow returns to S330, whereas if not, the flow returns to S332.

At S340 communication of the control channel of V. 34 is executed. At S342 (FIG. 18) a DIS signal of V. 21 is sent, and the counter DISCNT for counting the number of times of non-response from the partner apparatus is cleared.

At S344 an NSF/CSI/DIS signal of V. 21 is sent. In this case, the DIS signal has 10 bytes of FIF and a presence of a V. 34 communication function is notified by using the DIS signal. At S346 a T4 timer is set to 3 seconds.

At S348, S350, S353, and S354 it is checked whether the CI signal of V. 8 is received, whether the NSC/CIG/DTC signal of V. 21 is received, and the NSS/TSI/DCS signal of V. 21 is received, until the T4 timer becomes time-out. If the CI signal of V. 8 is received, the flow advances to S316, if the NSC/CIG/DTC signal of V. 21 is received, the flow advances to S356, and if the NSS/TSI/DCS signal of V. 21 is received, the flow advances to S372, and if the T4 becomes time-out, the flow advances to S362.

At S356 the pre-procedure of V. 21 is executed, at S358 the polling transmission of V. 27 ter, V. 29, and V. 17 is executed. At S360, the post-procedure of V. 21 is executed. At S362 the count of the counter DISCNT is incremented by 1.

Next, at S364 it is checked whether the timer T1 is time-out. If time out, the flow advances to S366 to execute an error process and return to S302, whereas if not, the flow advances to S368.

At S368 it is checked whether the count of the counter DISCNT is 2 or larger. If 2 or larger, the flow advances to S370, whereas if not, the flow advances to S344.

At S370 an NSF/CSI/DIS signal of V. 21 is sent. In this case, the DIS signal having 4 bytes of FIF is sent and a presence of the V. 34 communication function is not notified by using the DIS signal.

At S372 (FIG. 20) a remaining pre-procedure of V. 21 is executed, at S374 an image signal reception of V. 27 ter, V. 29, and V. 17 is executed, and at S376 an intermediate procedure of V. 21 is executed. At S378 it is checked whether there is a next page. If there is no next page, the flow advances to S382 to execute a post-procedure of V. 21, whereas there is the next page, the flow advances to S380.

At S380 it is checked whether there is a mode change. If not, the flow returns to S374, whereas if there is the mode change, the flow returns to S368.

Sixth Embodiment

Next, the sixth embodiment will be described.

In the sixth embodiment of the invention, a control circuit 220 has a means for controlling to change the number of bytes of FIF of a DIS signal of the initial identification signal. With this control, a DIS signal having F bytes of FIF is sent as the initial identification signal at the reception, until it is sent a predetermined number D of times a DIS signal having G bytes of FIF is sent as the initial identification signal, from the time in excess of the predetermined number F of times to a predetermined number E of times and a DIS signal having H bytes is sent as the initial identification signal from the time in excess of the predetermined number E of times. In this embodiment, it is assumed that F is 10, G is 6, H is 4, D is 2, and E is 4.

FIGS. 21 to 25 are flow charts illustrating the control operation of the control circuit 220.

Figure 21:
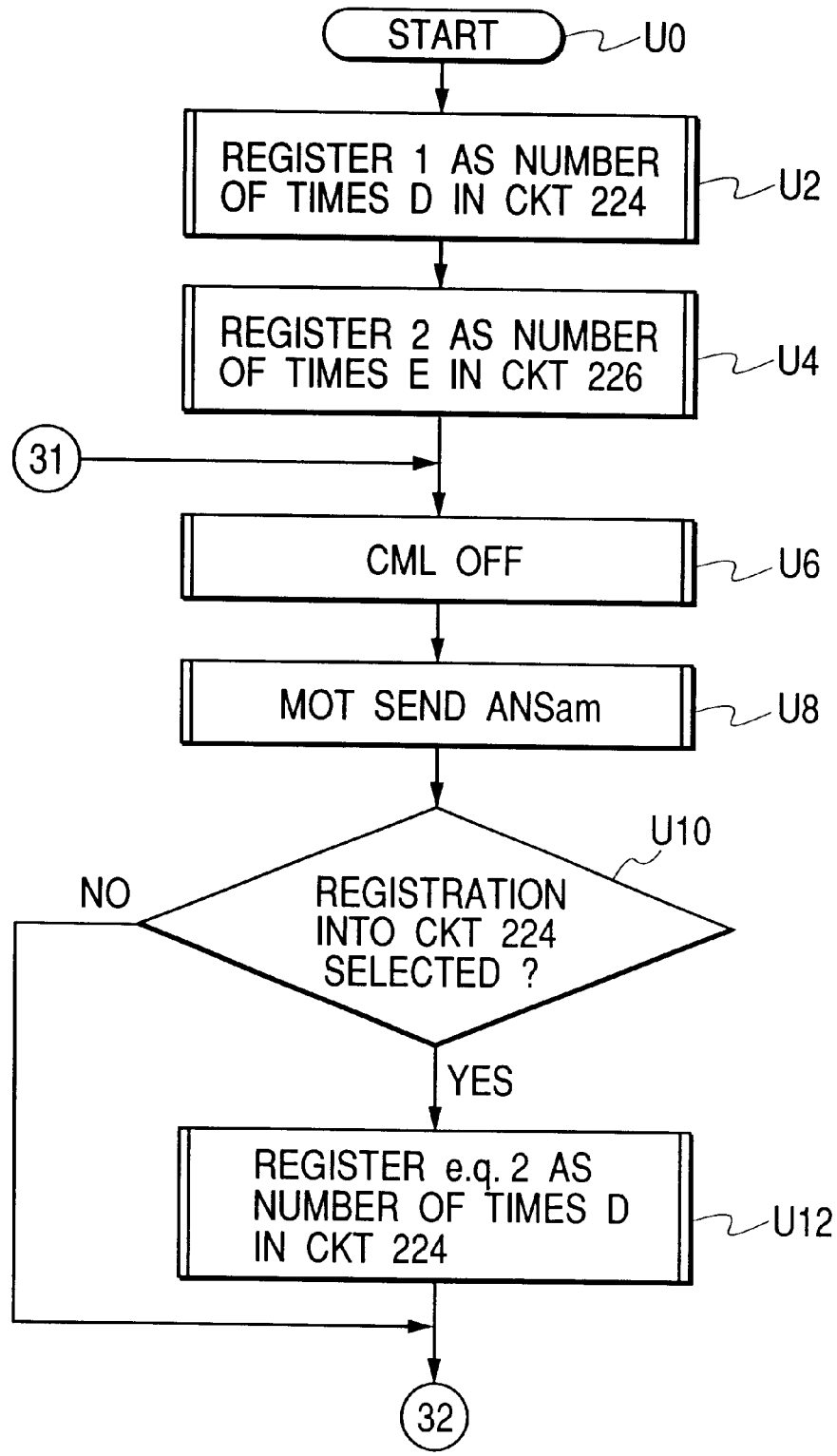
FIG. 21 is a flow chart illustrating the operation of a facsimile apparatus according to a sixth embodiment of the invention.
Figure 22:
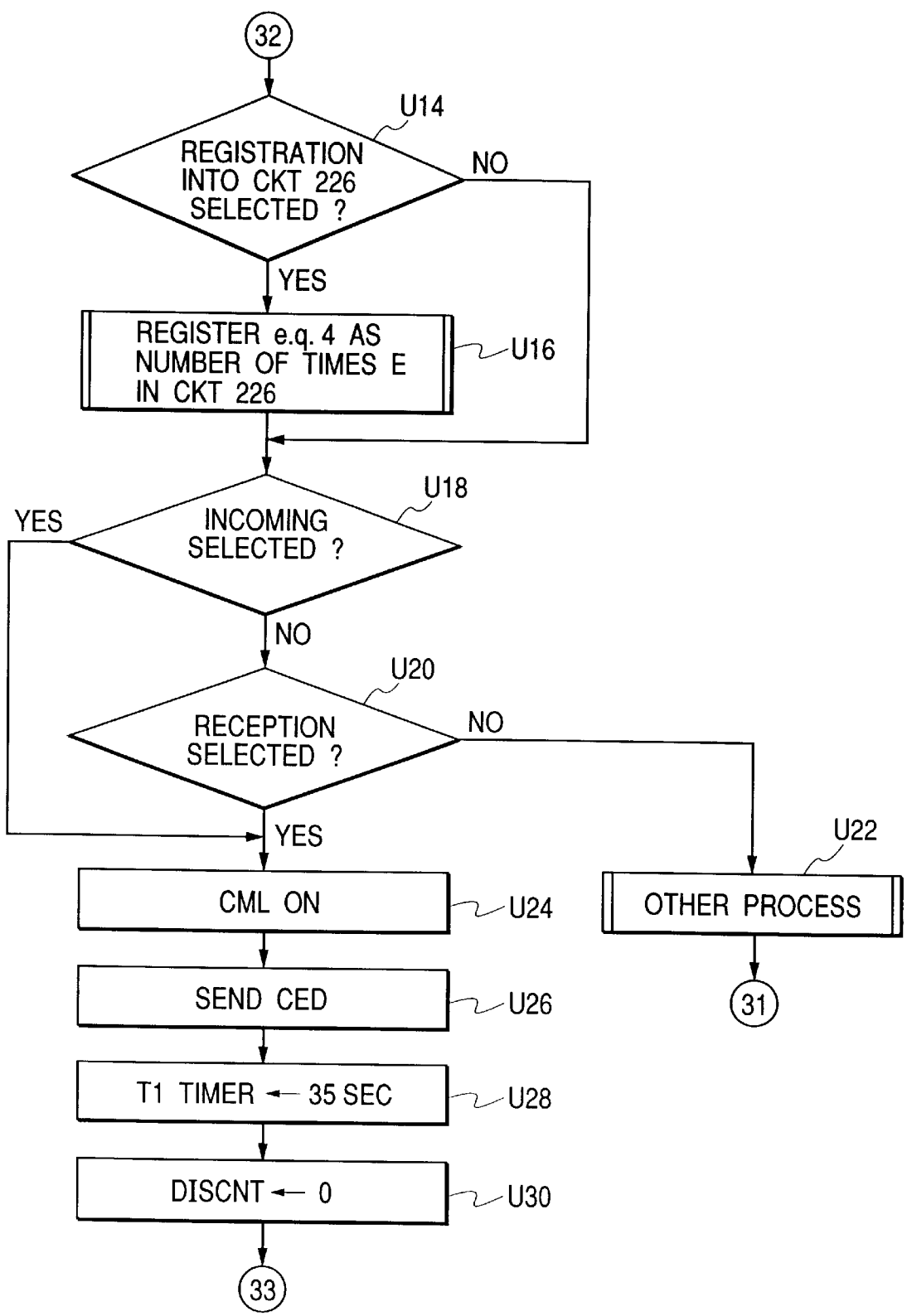
FIG. 22 is a flow chart illustrating the operation of the apparatus of the sixth embodiment.
Figure 23:
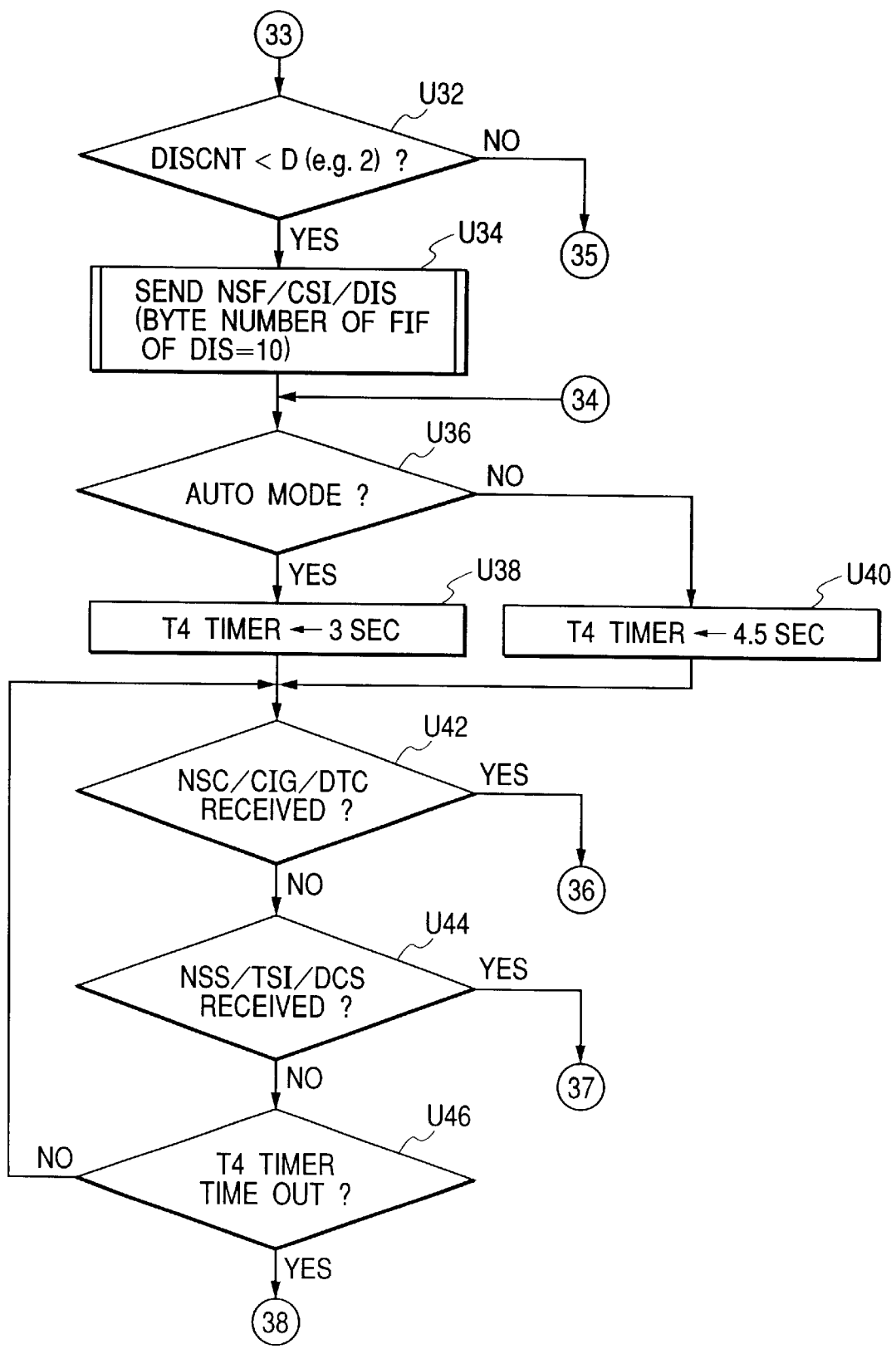
FIG. 23 is a flow chart illustrating the operation of the apparatus of the sixth embodiment.
Figure 24:
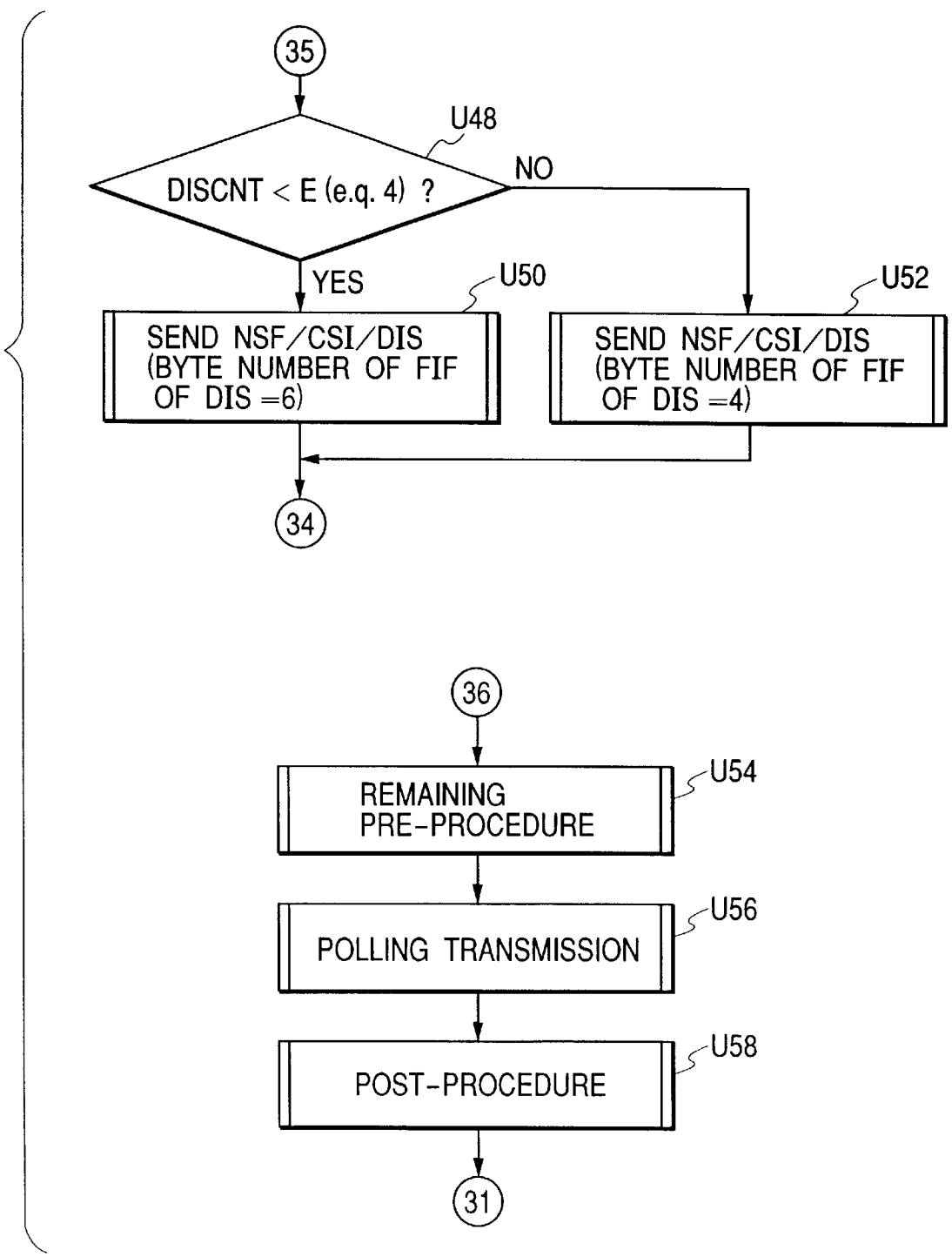
FIG. 24 is a flow chart illustrating the operation of the apparatus of the sixth embodiment.
Figure 25:
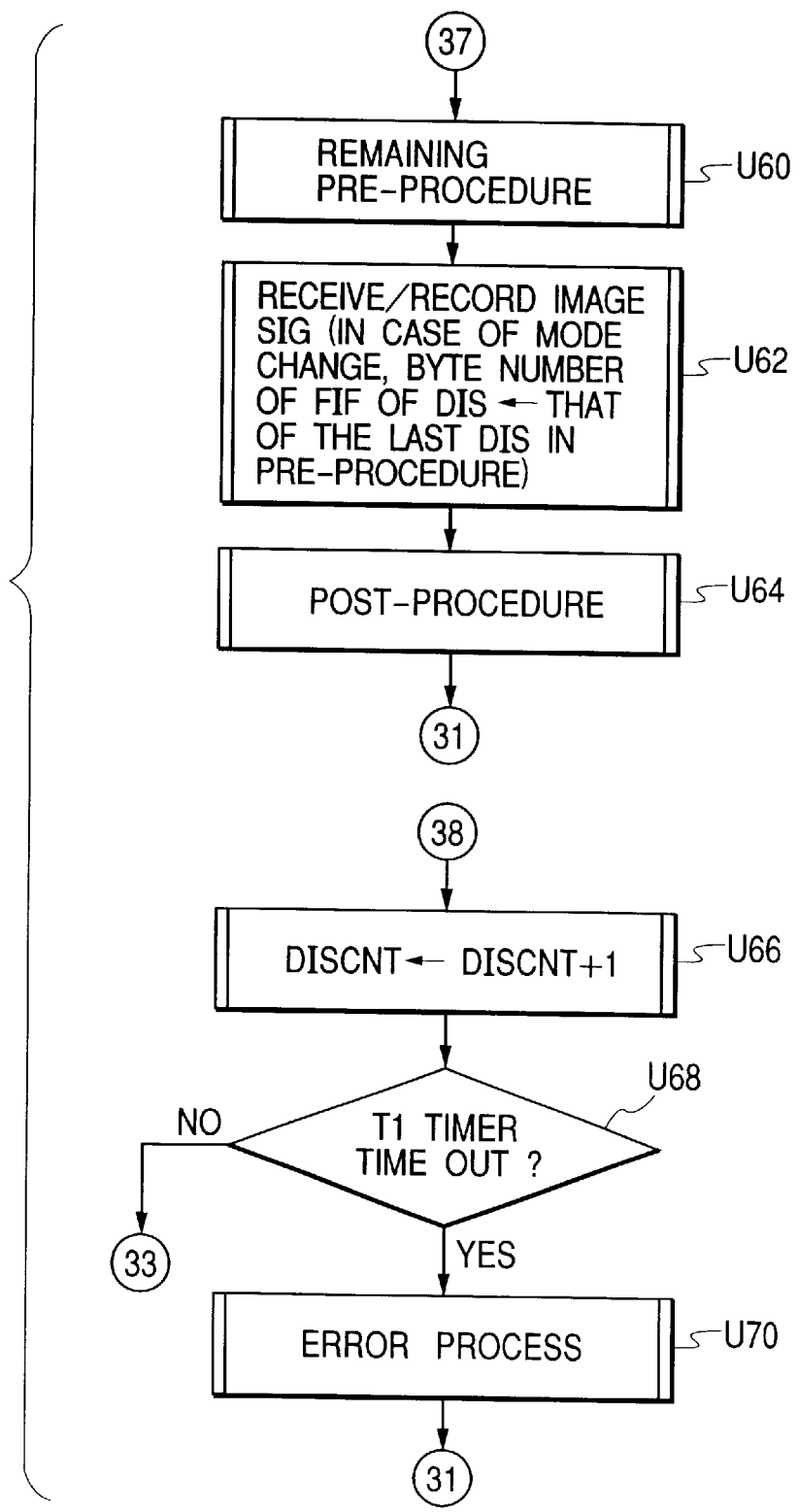
FIG. 25 is a flow chart illustrating the operation of the apparatus of the sixth embodiment.

Referring to FIG. 21, at U0 the operation starts, and at U2 an initial value 1of the predetermined number D of times is registered via the signal line 224a into the registration circuit 224. At U4 an initial value 2 of the predetermined number E of times is registered via the signal line 226a into the registration circuit 226.

At U6 a signal of level "0" is output to the signal line 20a so as not to send the CML signal.

At U8 a signal of level "0" is output to the signal line 20d so as not to send the ANSam signal. At U10 information is received from the signal line 222a to check whether registration into the registration circuit 224 is selected. If selected, the flow advances to U12 whereat the predetermined number D of times, e.g., 2, is registered via the signal line 224a into the registration circuit 224 to thereafter advance to U14, whereas if not selected, the flow advances directly to U14.

At U14 information is received from the signal line 222a to check whether registration into the registration circuit 226 is selected. If selected, the flow advances to U16 whereat the predetermined number E of times, e.g., 4, is registered via the signal line 226a to thereafter advance to U18, whereas if not selected at U14, the flow advances directly to U18.

At U18 it is checked whether incoming is selected. If selected, the flow advances to U24, whereas if not, the flow advances to U20.

At U20 it is checked whether reception is selected. If selected, the flow advances to U24, whereas if not, the flow advances to U22 whereat another process is executed to thereafter return to U6.

At U24 a signal of level "1" is output to the signal line 20a to turn on the signal CML. At U26 a CED signal is sent, and at U28 the timer T1 is set to 35 seconds.

At U30 the counter DISCNT is set to 0, the counter counting the number of times that the DIS signal is sent during the initial discrimination procedure (pre-procedure).

At U32 information is received from the signal line 224a to check whether the count of the counter DISCNT is the predetermined number D of times, e.g., 2 or smaller, registered in the registration circuit 224. If 2 or smaller, the flow advances to U34, whereas if not, the flow advances to U48.

At U34 an NSF/CSI/DIS signal of V. 21 is sent. FIF of the DIS signal has 10 bytes. At U36 it is checked whether the mode is an automatic mode. If it is an automatic mode, the flow advances to U38 whereat the T4 timer is set to 3 seconds, whereas if it is a manual mode, the flow advances to U40 whereat the timer T4 is set to 4.5 seconds.

At U42, U44, and U46 it is checked whether the NSC/CIG/DTC signal of V. 21 is received and it is checked whether the NSS/TSI/DCS signal of V. 21 is received, until the T4 timer becomes time-out. If the NSC/CIG/DTC of V. 21 is received, the flow advances to U54, whereas if the NSS/TSI/DCS signal of V. 21 is received, the flow advances to U60, and if the timer T4 becomes time-out, the flow advances to U66.

At U48 information is received from the signal line 226a to check whether the counter of the counter DISCNT is the predetermined number E of times, e.g., smaller than 4, registered in the registration circuit 26. If smaller than 4, the flow advances to U50, whereas if not, the flow advances to U52.

At U50 the NSF/CSI/DIS of V. 21 is sent. FIF of the DIS signal has 6 bytes. At U52 the NSF/CSI/DIS signal of V. 21 is sent. FIF of the DIS signal is 4 bytes. Thereafter, the flow returns to U36.

At U54 the remaining pre-procedure is executed, at U56 polling transmission is executed, and at U58 the post-procedure is executed, to thereafter return to U6.

At U60 the remaining pre-procedure is executed. At U62 image signal reception/recording is executed. In this case, if a mode is changed, FIF of the DIS signal is set to the number of bytes same as that of FIF of the DIS signal received as an effective response from the partner apparatus (i.e., the last sent DIS signal in the pre-procedure). At U64 the post-procedure is executed to thereafter return to U6.

At U66 the count of the counter DISCNT is incremented by 1. At U68 it is checked whether the timer T1 is time-out. If time-out, the flow advances to U70 whereat an error process is executed to thereafter return to U6, whereas it not time-out, the flow returns to U32.

Seventh Embodiment

Next, the seventh embodiment of the invention will be described.

In the seventh embodiment, different from the sixth embodiment, the predetermined numbers D and E of times are set differently for the automatic mode and manual mode.

Figure 26:
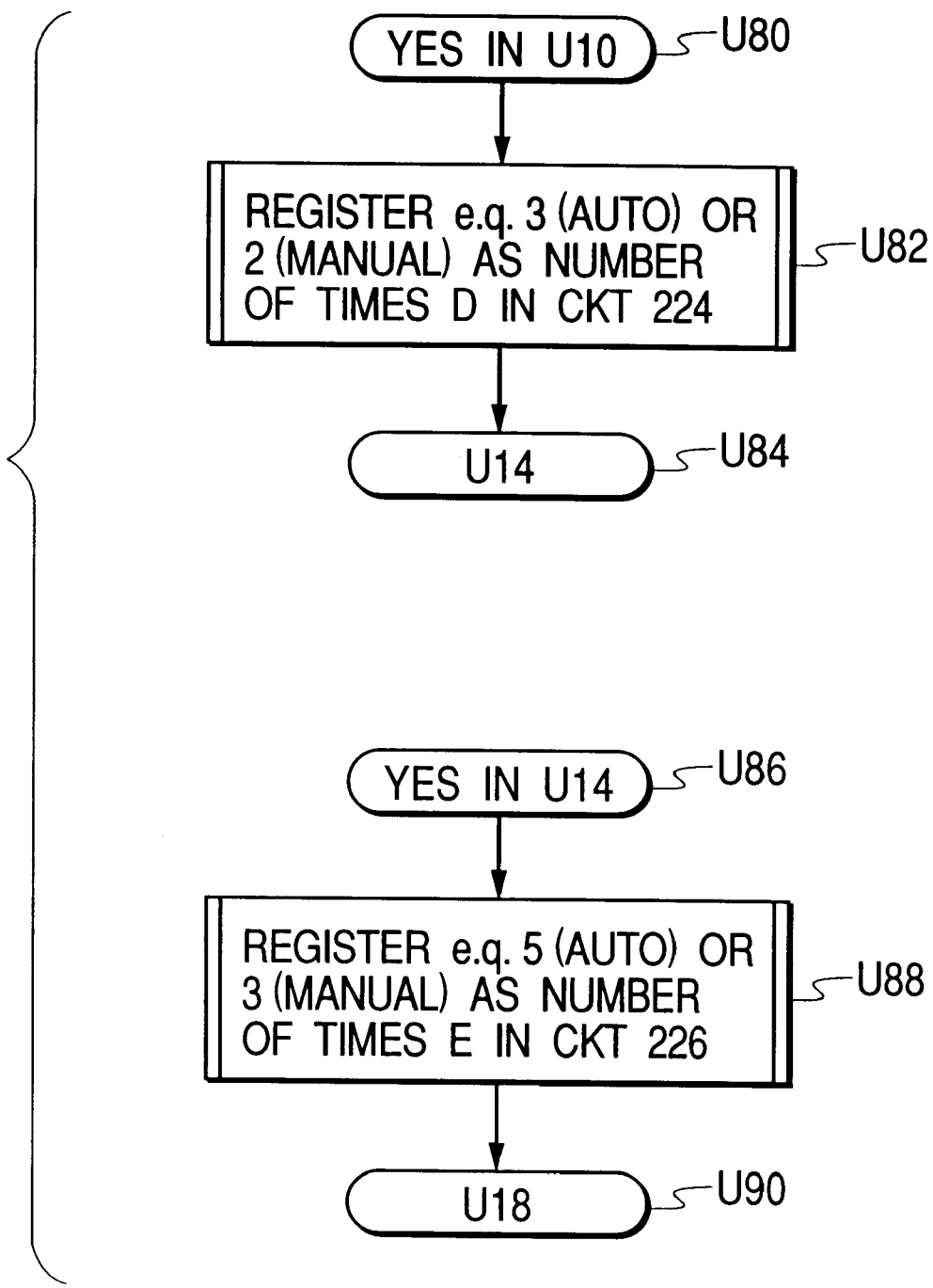
FIG. 26 is a flow chart illustrating the operation of a facsimile apparatus according to a seventh embodiment of the invention.
Figure 27:
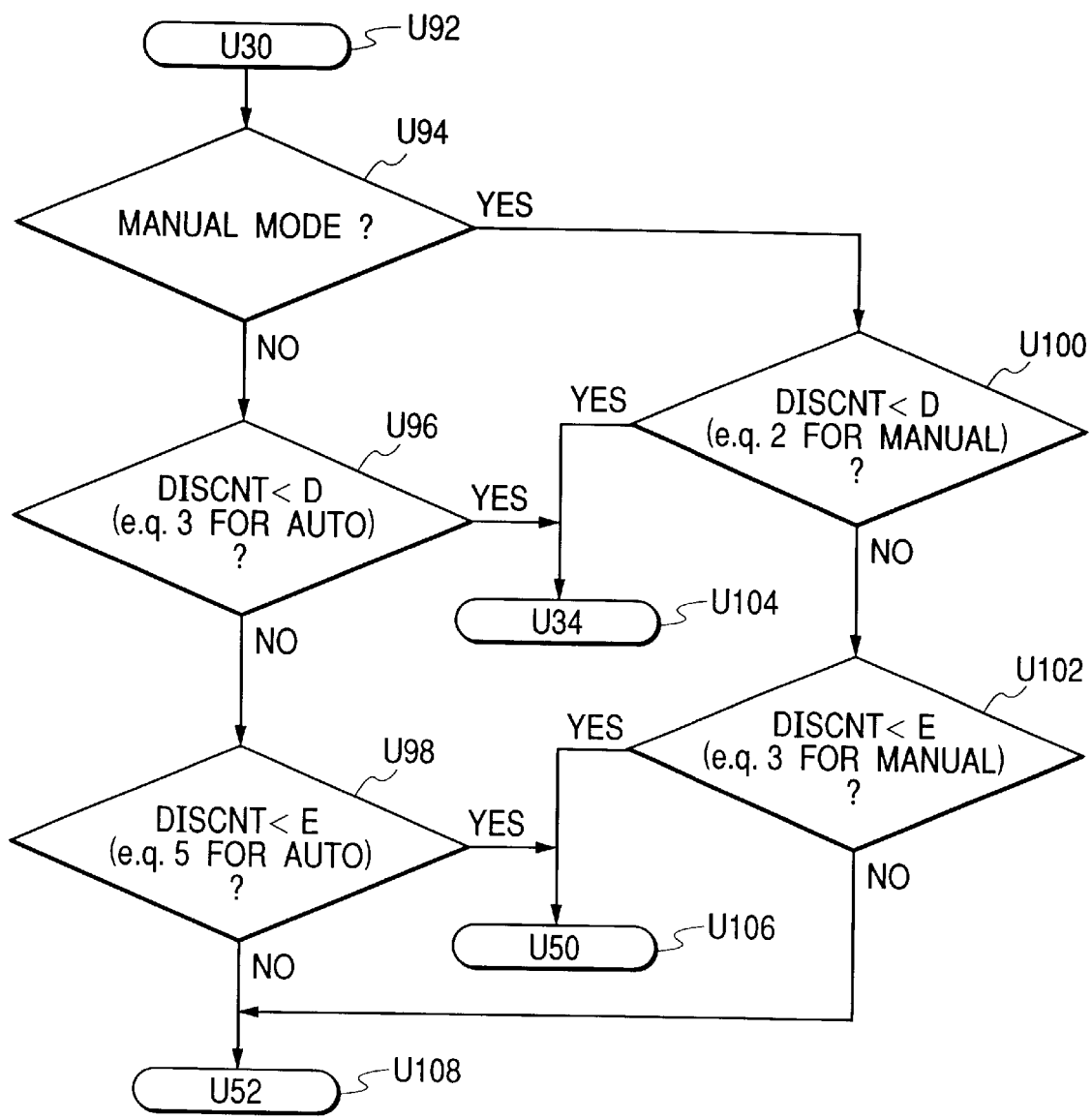
FIG. 27 is a flow chart illustrating the operation of the apparatus of the seventh embodiment.

FIGS. 26 and 27 are flow charts illustrating only a partial operation of the seventh embodiment, which is different from that of the sixth embodiment (FIGS. 21 to 25).

Referring to FIG. 26, U80 corresponds to YES at U10. At U82 the predetermined number D of times, e.g., 3 for the automatic mode and 2 for the manual mode, is registered via the signal line 224a into the registration circuit 224. The flow advances to U84 and then returns to U14.

U86 corresponds to YES at U14. At U88 the predetermined number E of times, e.g., 5 for the automatic mode and 3 for the manual mode, is registered via the signal line 226a into the registration circuit 226. The flow advances to U90 and then returns to U18.

U92 corresponds to U30. At U94 it is checked whether the mode is an automatic mode. If it is a manual mode, the flow advances to U100, whereas if it is an automatic mode, the flow advances to U96.

At U96 it is checked whether the count of the counter DISCNT is the predetermined number D of times for the automatic mode, e.g., smaller than 3, registered in the registration circuit 224. If smaller than 3, the flow advances to U104 (U34), whereas if not, the flow advances to U98.

At U98 it is checked whether the count of the counter DISCNT is the predetermined number E of times for the automatic mode, e.g., smaller than 5, registered in the registration circuit 226. If smaller than 5, the flow advances to U106 (U50), whereas if not, the flow advances to U108 (U52).

At U100 it is checked whether the count of the counter DISCNT is the predetermined number D of times for the manual mode, e.g., smaller than 2, registered in the registration circuit 224. If smaller than 2, the flow advances to U104, whereas if not, the flow advances to U102.

At U102 it is checked whether the count of the counter DISCNT is the predetermined number E of times for the manual mode, e.g., smaller than 3, registered in the registration circuit 226. If smaller than 3, the flow advances to U106, whereas if not, the flow advances to U108 (U52).

Eighth Embodiment

Next, the eighth embodiment of the invention will be described.

In the eighth embodiment, different from the sixth embodiment, the predetermined numbers D and E of times are determined differently in accordance with a presence/absence of transmission of the CSI signal.

Figure 28:
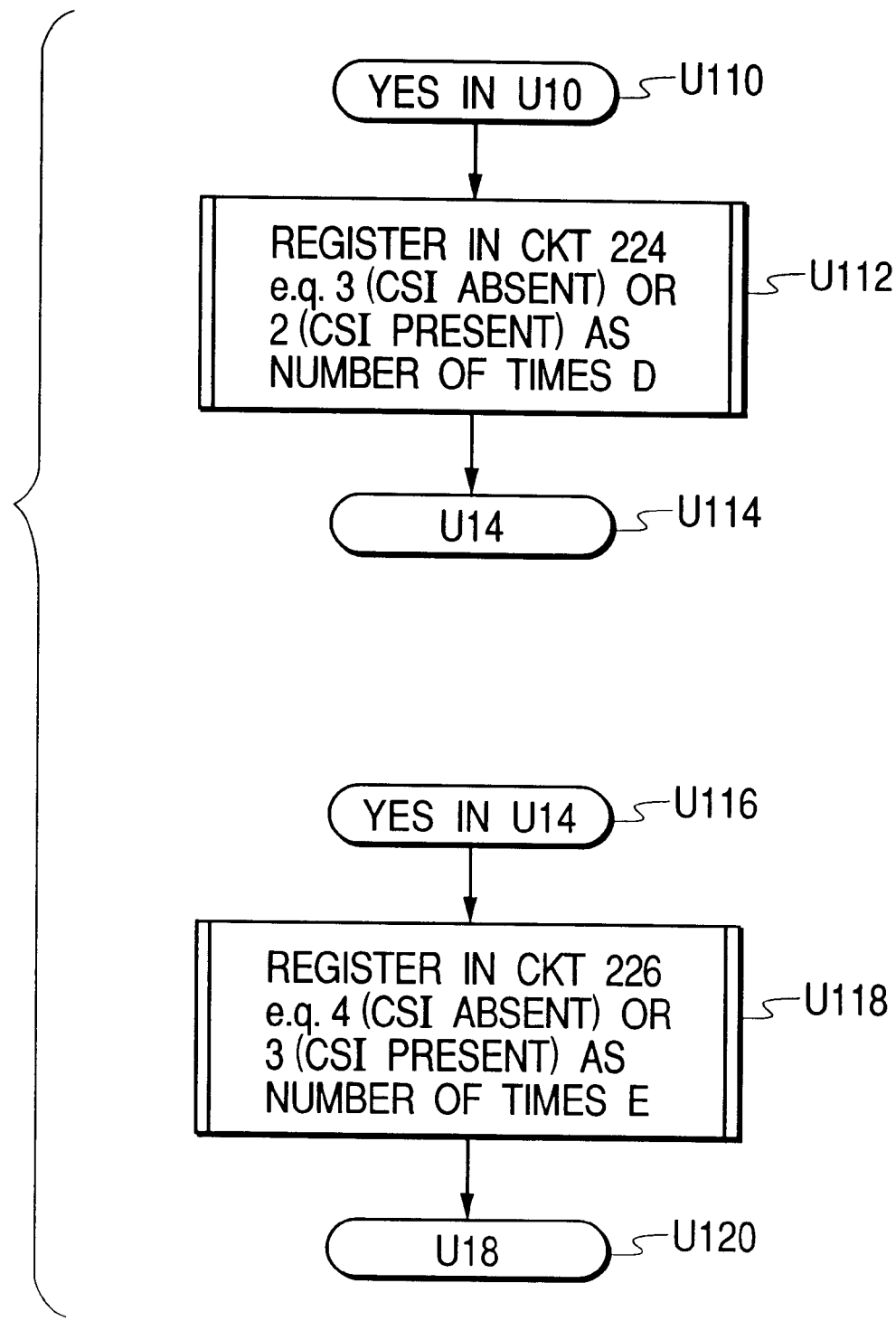
FIG. 28 is a flow chart illustrating the operation of a facsimile apparatus according to an eighth embodiment of the invention.
Figure 29:
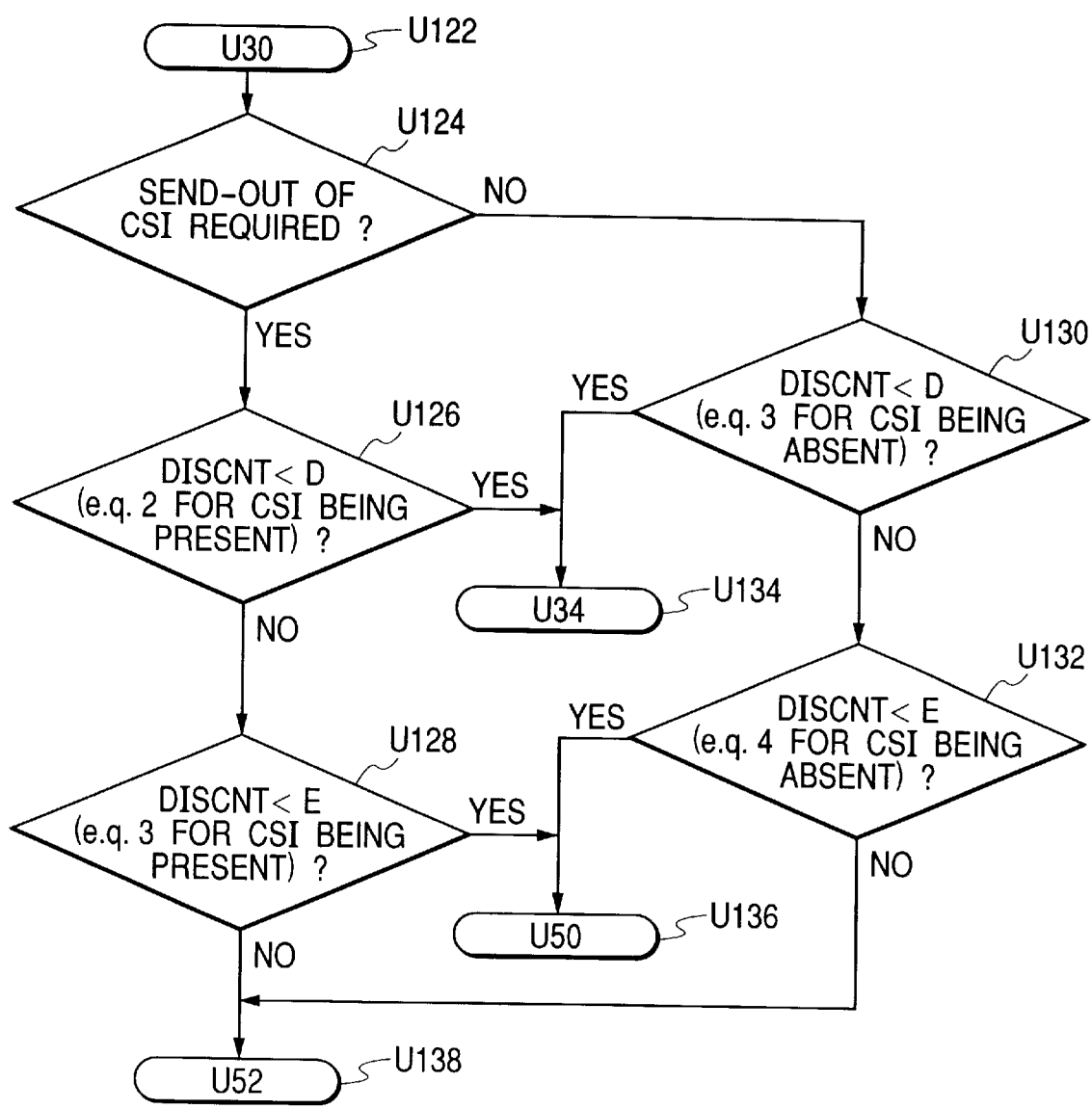
FIG. 29 is a flow chart illustrating the operation of the apparatus of the eighth embodiment.

FIGS. 28 and 29 are flow charts illustrating only a partial operation of the eighth embodiment, which is different from that of the sixth embodiment (FIGS. 21 to 25).

Referring to FIG. 28, U110 corresponds to YES at U10. At U112 the predetermined number D of times, e.g., 3 for the absence of the CSI signal and 2 for the presence of the CSI signal, is registered via the signal line 224a into the registration circuit 224. The flow advances to U114 and then returns to U14.

U116 corresponds to YES at U14. At U118 the predetermined number E of times, e.g., 4 for the absence of the CSI signal and 3 for the presence of the CSI signal, is registered via the signal line 226a into the registration circuit 226. The flow advances to U120 and then returns to U18.

U122 corresponds to U30. At U124 it is checked whether the CSI signal is to be sent. If it is to be sent, the flow advances to U120, whereas if it is not to be sent, the flow advances to U130.

At U126 it is checked whether the count of the counter DISCNT is the predetermined number D of times for the presence of the CSI signal, e.g., smaller than 2, registered in the registration circuit 224. If smaller than 2, the flow advances to U134 (U34), whereas if not, the flow advances to U128.

At U128 it is checked whether the count of the counter DISCNT is the predetermined number E of times for the presence of the CSI signal, e.g., smaller than 3, registered in the registration circuit 226. If smaller than 3, the flow advances to U136 (U50), whereas if not, the flow advances to U138 (U52).

At U130 it is checked whether the count of the counter DISCNT is the predetermined number D of times for the absence of the CSI signal, e.g., smaller than 3, registered in the registration circuit 224. If smaller than 3, the flow advances to U134, whereas if not, the flow advances to U132.

At U132 it is checked whether the count of the counter DISCNT is the predetermined number E of times for the absence of the CSI signal, e.g., smaller than 4, registered in the registration circuit 226. If smaller than 4, the flow advances to U136, whereas if not, the flow advances to U138 (U52).

Ninth Embodiment

Next, the ninth embodiment of the invention will be described.

In the ninth embodiment, the control circuit 220 bytes of FIF of a DIS signal. With this control, a DIS signal having 10 bytes of FIF is sent as the initial identification signal at the reception, and if a pre-procedure error occurs, a DIS signal having 4 bytes of FIF is sent as the initial identification signal at the next reception.

FIGS. 30 to 33 are flow charts illustrating the control operation of the control circuit 220 according to the ninth embodiment.

Figure 30:
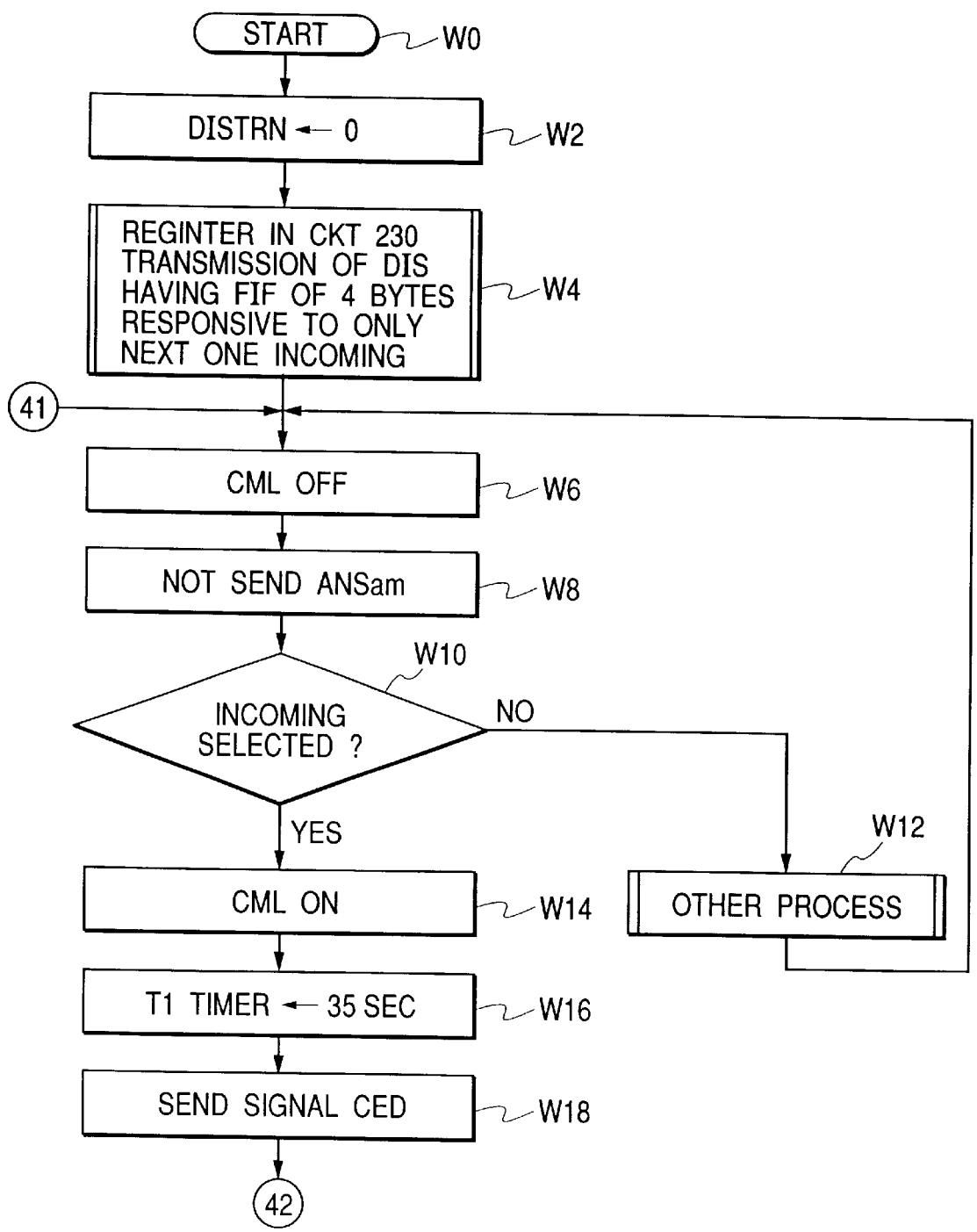
FIG. 30 is a flow chart illustrating the operation of a facsimile apparatus according to a ninth embodiment of the invention.
Figure 31:
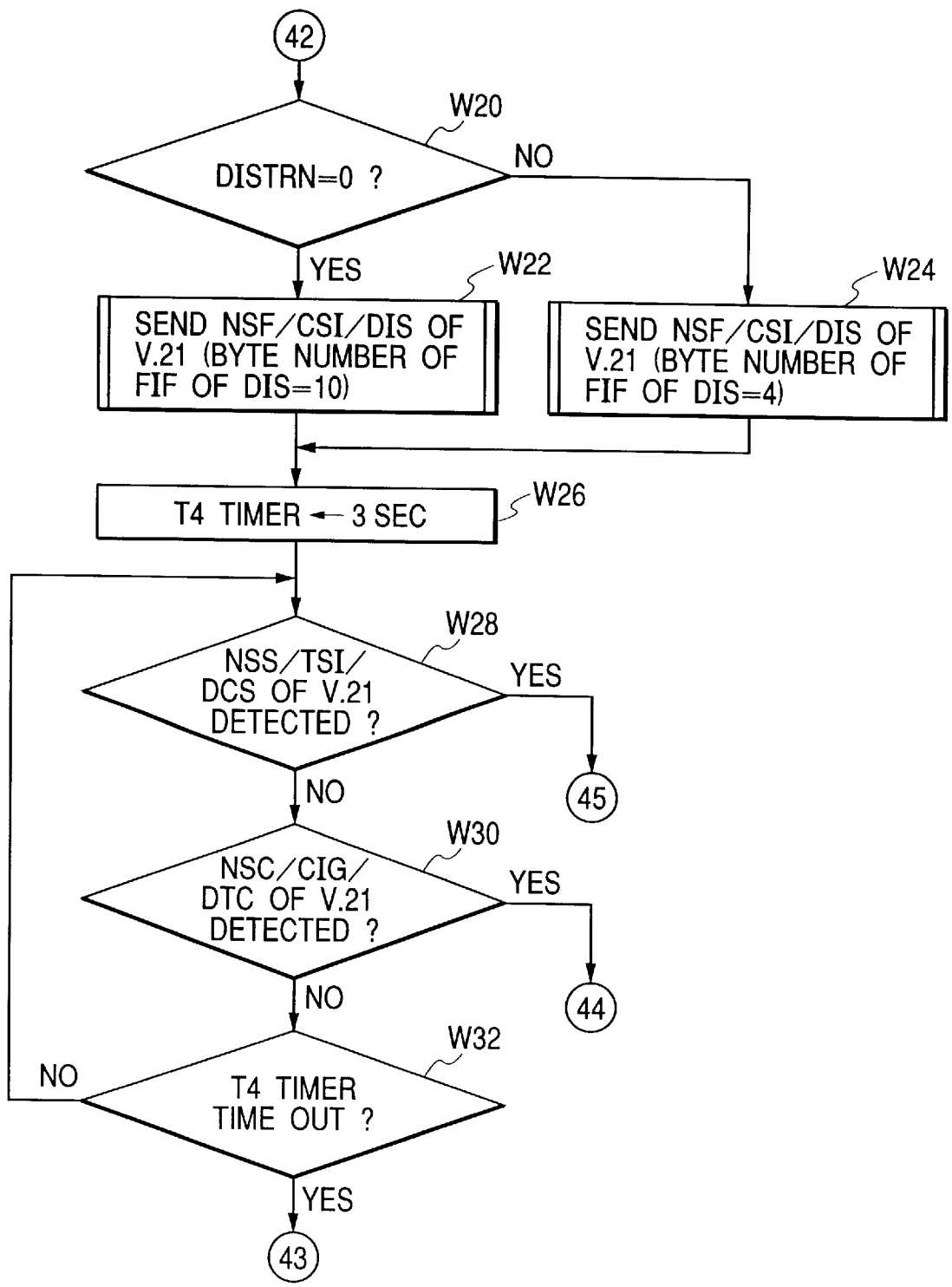
FIG. 31 is a flow chart illustrating the operation of the apparatus of the ninth embodiment.
Figure 32:
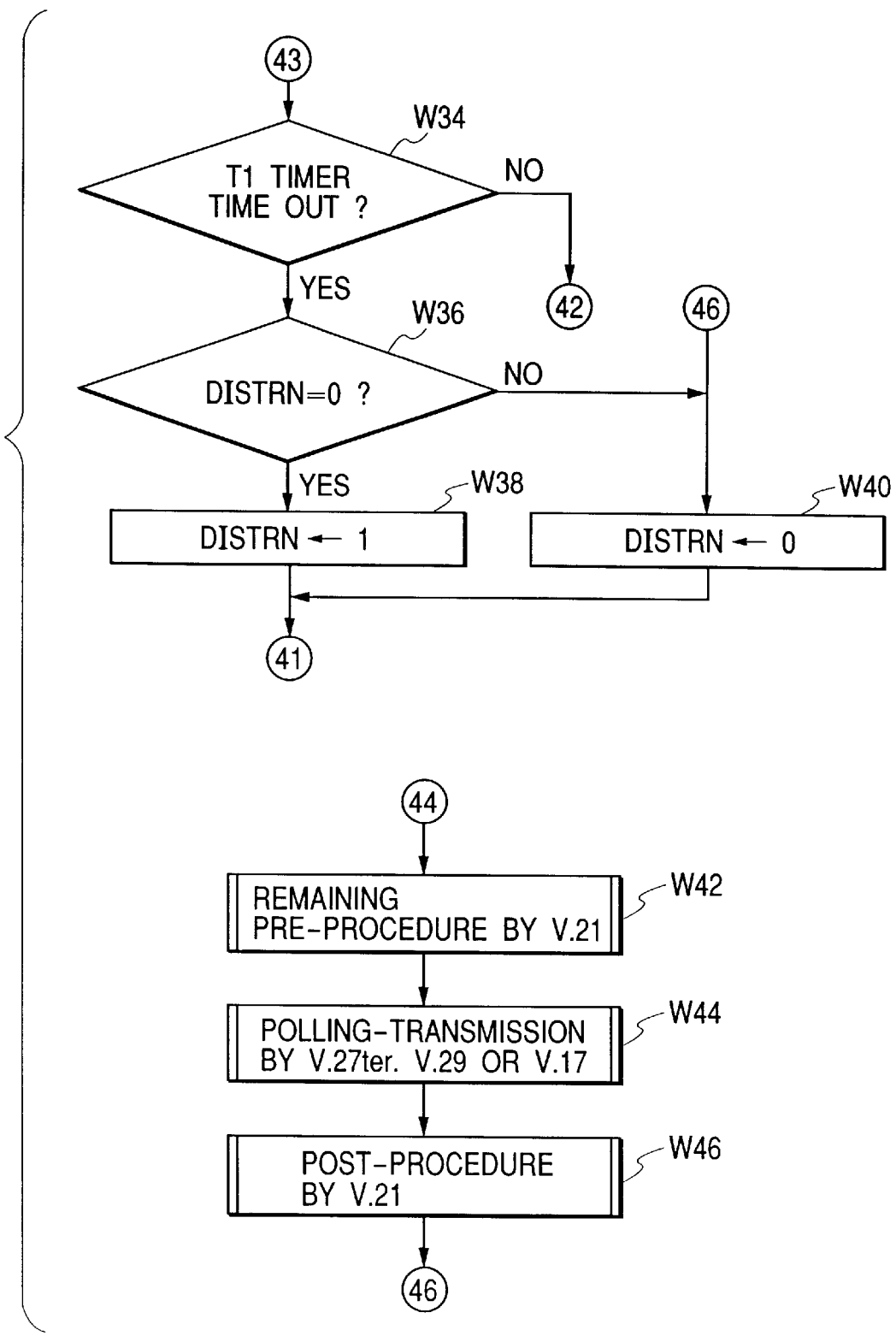
FIG. 32 is a flow chart illustrating the operation of the apparatus of the ninth embodiment.
Figure 33:
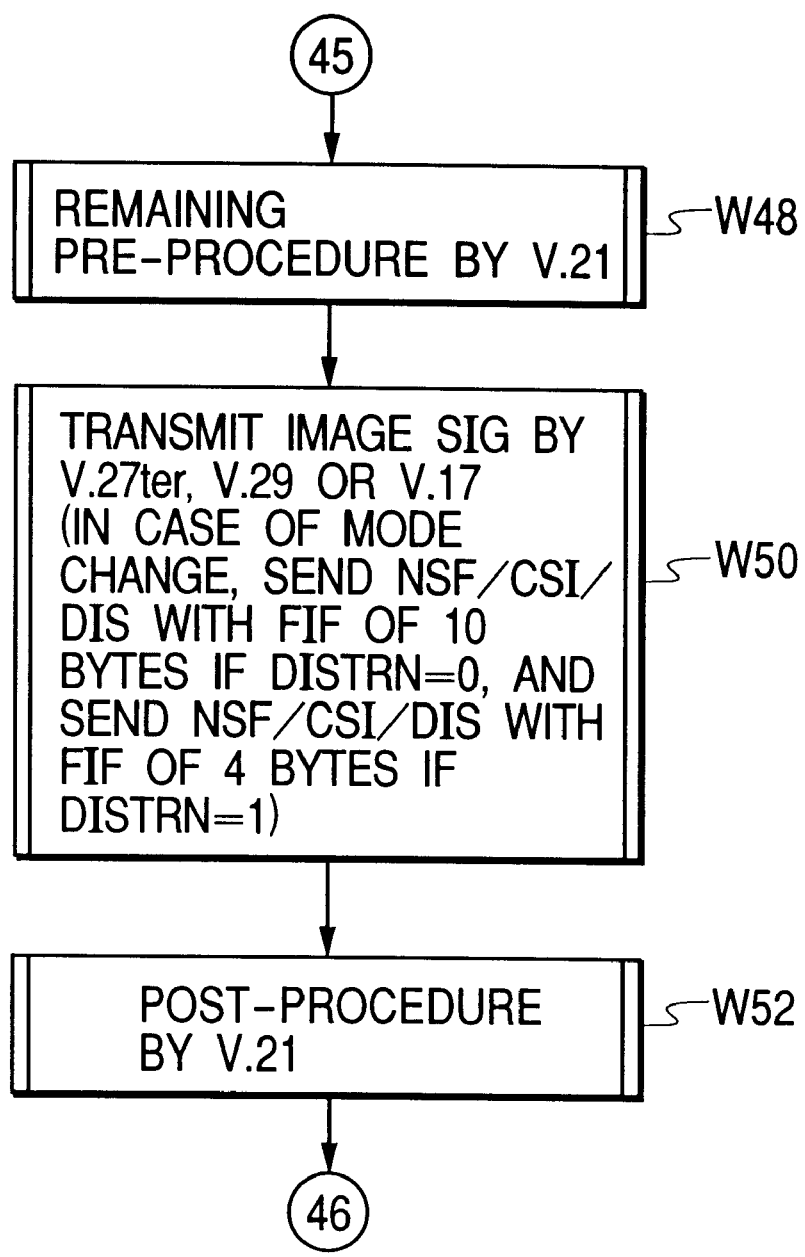
FIG. 33 is a flow chart illustrating the operation of the apparatus of the ninth embodiment.

Referring to FIG. 30, the operation starts at W0, and at W2 a flag DISTRN is set to 0 to set FIF to 10 bytes. The flag indicates whether FIF of a DIS signal is to be set to 4 bytes or 10 bytes.

At W4 a transmission of a DIS signal having 10bytes of FIF and if there is a pre-procedure error a transmission of a DIS signal having 4 bytes of FIF only at the next reception, are registered via the signal line 230a into the registration circuit 230.

At W6 a signal of level "0" is output to the signal line 20a so as not to send the CML signal. At W8 a signal of level "0" is output to the signal line 20d so as not to send the ANSam signal.

At W10 information is received from the signal line 222a to check whether the reception is selected. If selected, the flow advances to W14, whereas if not, the flow advances to W12 whereat another process is executed to thereafter return to W6.

At W14 a signal of level "1" is output to the signal line 20a to turn on the CML signal. At W16 the timer T1 is set to 35 seconds. At W18 a CED signal is sent.

At W20 it is checked whether the flag DISTRN is 0. If 0, the flow advances to W22, whereas if the flag is 1, the flow advances to W24.

At W22 the NSF/CSI/DIS signal of V. 21 is sent. FIF of the DIS signal is 10 bytes.

At W24 the NSF/CSI/DIS signal of V. 21 is sent. FIF of the DIS signal is 4 bytes.

At W26 the timer T4 is set to 3 seconds. At W28, W30, and W32 it is checked whether the NSS/TSI/DCS signal of V. 21 is detected and it is checked whether the NSC/CIG/DTC of V. 21 is detected, until the timer T4 becomes time-out. If the NSS/TSI/DCS signal of V. 21 is detected, the flow advances to W48, whereas if the NSC/CIG/DTC signal of V. 21 is detected, the flow advances to W42 and if the timer T4 becomes time-out, the flow advances to W34.

At W34 it is checked whether the timer T1 is time-out. If time-out, the flow advances to W36, whereas if not, the flow returns to W20.

At W36 the value of the flag DISTRN is checked. If the value is 0, the flow advances to W38 whereat the flag DISTRN is set to 1, whereas if the value is 1, the flow advances to W40 whereat the flag DISTRN is set to 0.

At W42 the remaining pre-procedure of V. 21 is executed, and at W44 polling transmission of V. 27 ter, V. 29, and V. 17 is executed. At W46 the post-procedure of V. 21 is executed to thereafter return to W40.

At W48 the remaining pre-procedure of V. 21 is executed, and at W50 image signal transmission of V. 27 ter, V. 29, and V. 17 is executed. If there is a mode change and if the flag DISTRN is 0, the NSF/CSI/DIS signal of V. 21 is sent with the DIS signal having 10 bytes of FIF, whereas if the flag DISTRN is 1, the NSF/CSI/DIS signal of V. 21 is sent with the DIS signal having 4 bytes of FIF. At W52, the post-procedure of V. 21 is executed to thereafter return to W40.

Tenth Embodiment

Next, the tenth embodiment of the invention will be described.

The tenth embodiment is a modification of the ninth embodiment. A DIS signal having 10 bytes of FIF is sent as the initial identification signal at the reception, and if a pre-procedure error occurs, a DIS signal having 4 bytes of FIF is sent as the initial identification signal during the period of 20 seconds after the error is detected.

Figure 34:
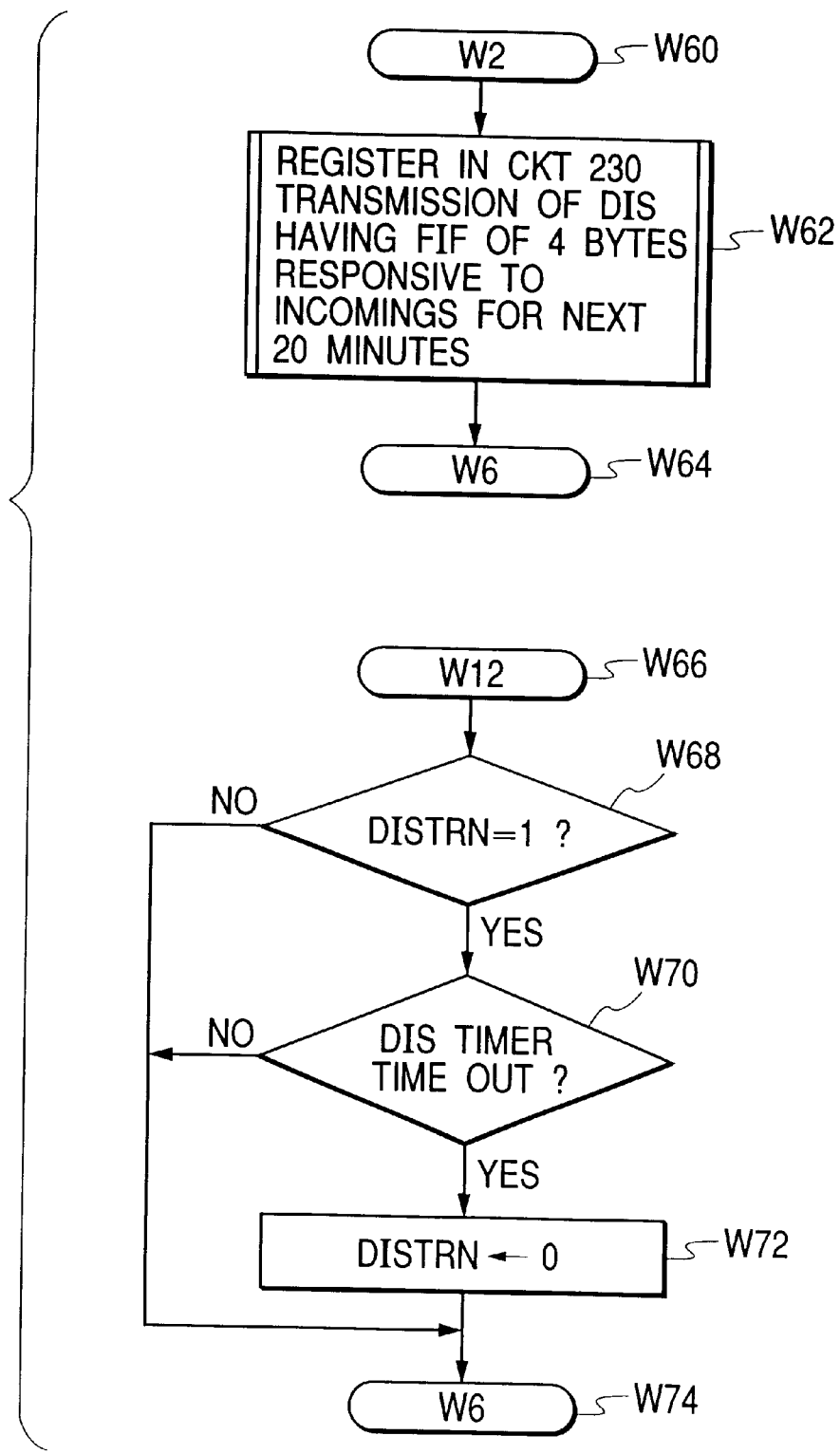
FIG. 34 is a flow chart illustrating the operation of a facsimile apparatus according to a tenth embodiment of the invention.
Figure 35:
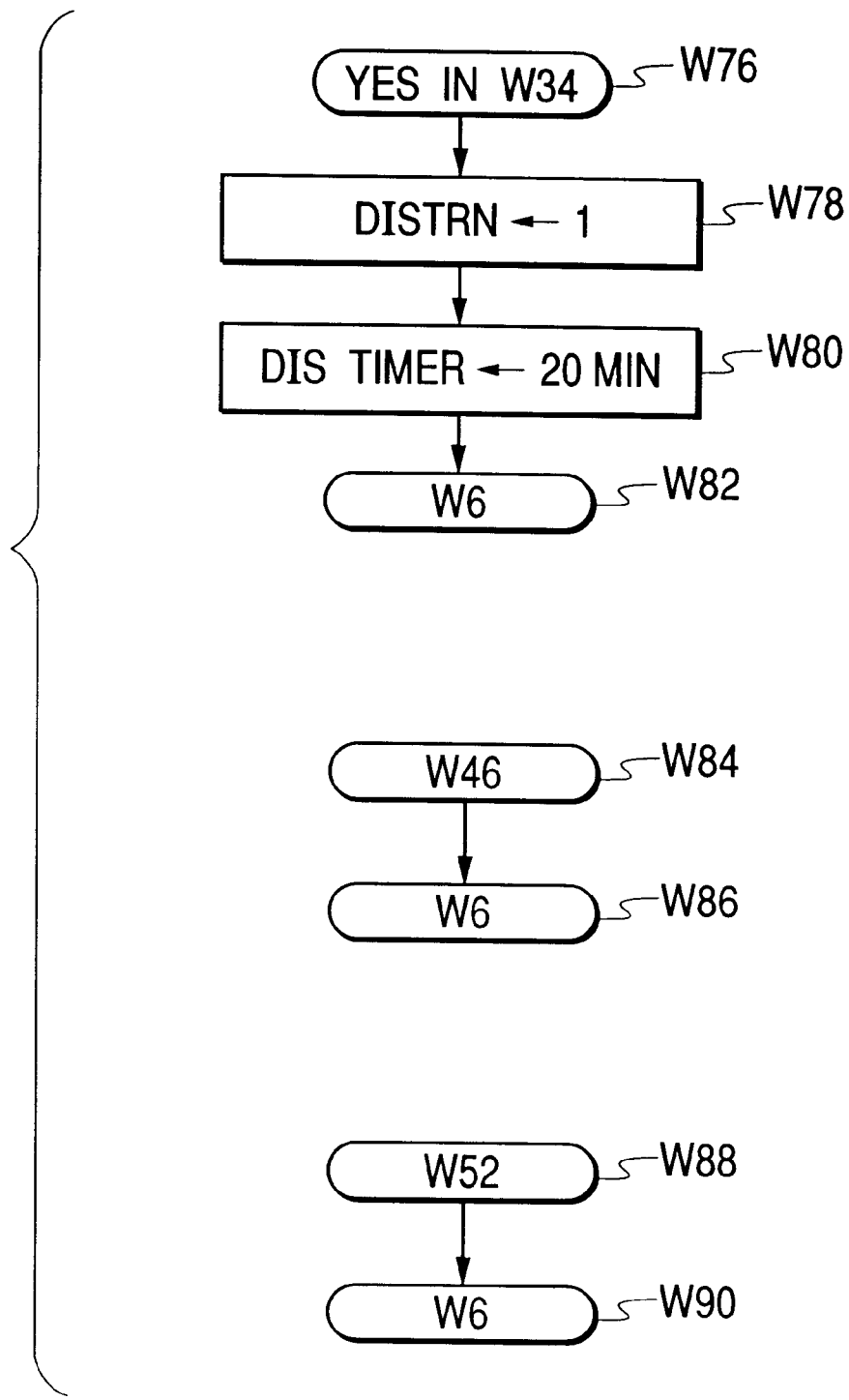
FIG. 35 is a flow chart illustrating the operation of the apparatus of the tenth embodiment.

FIGS. 34 and 35 are flow charts illustrating only a partial operation of the tenth embodiment, which is different from the ninth embodiment (FIGS. 30 to 33).

Referring to FIG. 34, W60 corresponds to W2. At W62 a transmission of a DIS signal having 4 bytes of FIF only at the reception during a period of 20 minutes thereafter is registered via the signal line 230a into the registration circuit 230 to thereafter advance to W64 whereat the flow returns to W6.

W66 corresponds to W12. At W68 it is checked whether the flag DISTRN is 1or not. If 1, the flow advances to W70, whereas if 0, the flow advances to W74 (W6).

At W70 it is checked whether a DIS timer is time-out. If time-out, the flow advances to W72 whereat the flag DISTRN is set to 0 to thereafter advance to W74 (W6), whereas if not time-out, the flow advances to W74 (W6).

W76 corresponds to YES at W34. At W78 the flag DISTRN is set to 1. Next, at W80 the DIS timer is set to 20 minutes. Thereafter, the flow returns to W6.

At W84 and W86, the flow from W46 to W6 is executed, and at W88 and W90, the flow from W52 to W6 is executed. Namely, it means that the process of W40 is not executed (0 is set to the flag DISTRN).

Eleventh Embodiment

Next, the eleventh embodiment of the invention will be described.

The eleventh embodiment is a combination of the ninth and tenth embodiments. A transmission of a DIS signal having 4 bytes of FIF is executed only for the next one reception or for the reception during 20 minutes after the DIS signal having 10 bytes of FIF is sent and a pre-procedure error occurs, is registered in the registration circuit 230. In accordance with this registration information, reception control is performed.

Figure 36:
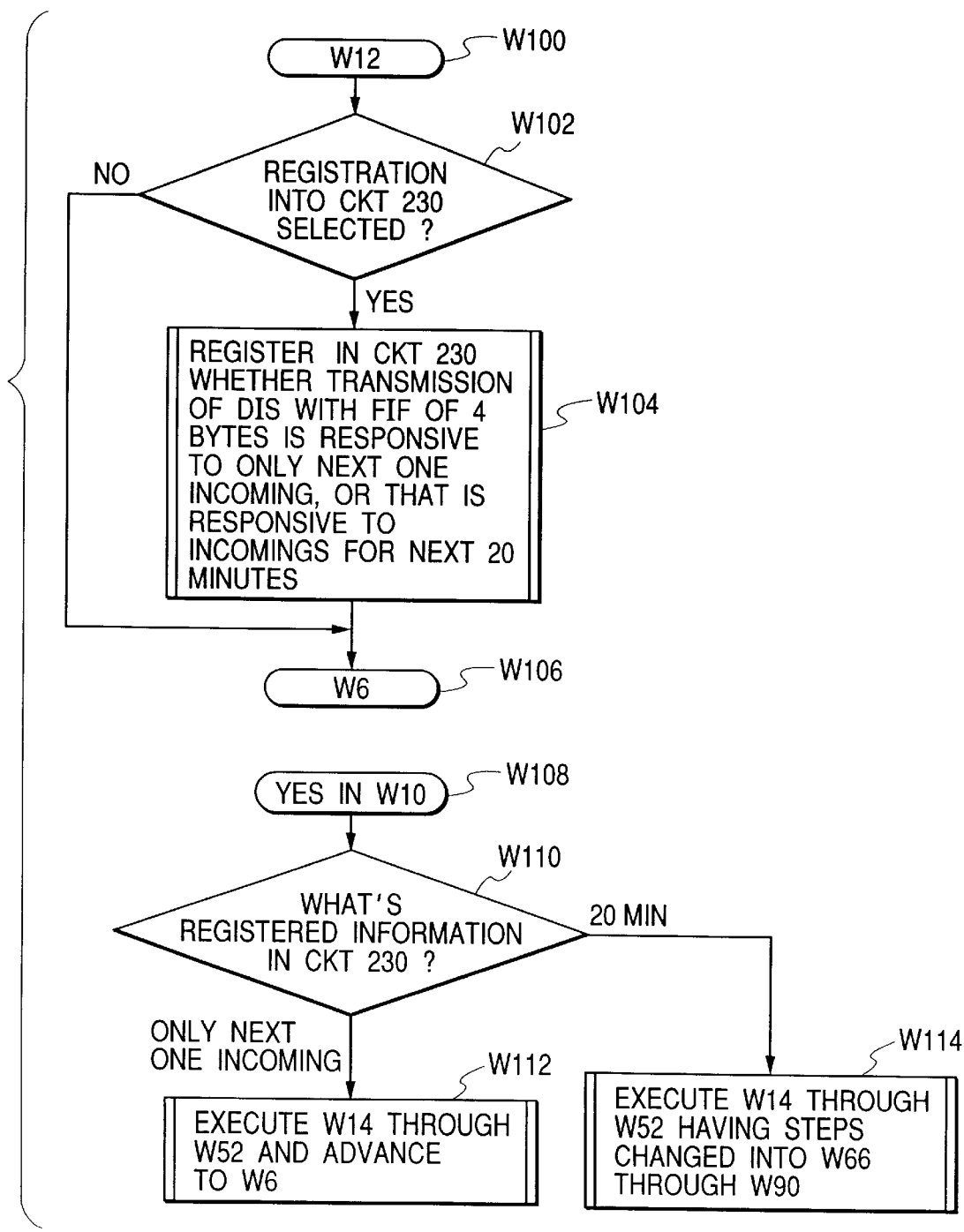
FIG. 36 is a flow chart illustrating the operation of a facsimile apparatus according to an eleventh embodiment of the invention.

FIG. 36 is a flow chart illustrating only a partial operation of the eleventh embodiment, which is different from the ninth and tenth embodiments (FIGS. 30 to 35).

Referring to FIG. 36, W100 corresponds to W12. At W102 information is received from the signal line 222a to check whether the registration into the registration circuit 230 is selected. If selected, the flow advances to S104 whereat a transmission of a DIS signal having 4 bytes of FIF is executed only for the next one reception or for the reception during 20 minutes after the DIS signal having 10 bytes of FIF is sent and a pre-procedure error occurs, is registered via the signal line 230a into the registration circuit 230. The flow then advances to W108 (W6). If the registration is not selected, the flow advances directly to W106 (W6).

W108 corresponds to YES at W10. At W110 information registered in the registration circuit 230 is received via the signal line 230a. If a transmission of the DIS signal having 4 bytes of FIF only for the next one reception is registered, the flow advances to W112 whereat the above-described control from W14 to W52 is executed to thereafter return to W6. If a transmission of the DIS signal having 4 bytes of FIF for the reception during a period of 20 minutes thereafter is registered, the flow advances to W114 whereat the above-described control from W66 to W90 in place of the control from W14 to W52 is executed to thereafter return to W6.

The operation of the control circuit described above is executed by a CPU in the control circuit in accordance with a program stored in ROM, RAM or the like of the control circuit. The present invention may be reduced in practice by storing such a program in an external storage medium such as a floppy disk, a hard disk, a magnetooptical disk, and a CD-ROM, by reading the program with a dedicated reading apparatus and storing it in the memory of the control circuit, and by executing the program by CPU.

In the above embodiments, facsimile communication in conformity with ITU-T Recommendations V. 8 and V. 34 are described. The invention may also be applied to various other communication apparatuses which follow the communication protocol having a function similar to the above Recommendations.

Also in the above embodiments, a facsimile apparatus of a stand-alone type has been described by way of example. The invention is not limited only thereto, but is also applicable to data communication control of a synthetic data processing system with a communication function combined with a copy function, an electronic file function, and a data processing function. The invention can also be applied to a communication apparatus with separated reading and recording circuits.

As described so far, according to the fifth and sixth embodiments, in a facsimile apparatus having the functions of V. 8 and V. 34, it is possible to always send a DIS signal having 10 bytes of FIF, with a maximum performance of the V. 8 protocol and V. 34 protocol. If a DIS signal having 10 bytes of FIF of V. 21 is transmitted and there is no effective response, then a DIS signal having 4 bytes of FIF is sent so that reliable communication can be made although the performance lowers more or less.

According to the fifth to eleventh embodiments, even if a data communication apparatus communicates with an apparatus not compatible with an extended FIF of a DIS signal, communication can be made by using the maximum performance of the partner apparatus having the number of bytes of FIF of a DIS signal recommended at the design time of the partner apparatus.

According to the seventh embodiment, although the re-transmission interval of a DIS signal is different, 4.5 seconds for the manual mode and 3seconds for the automatic mode, the predetermined numbers D and E of times can be properly set so that reliable communication can be made.

According to the eighth embodiment, although one initial identification signal NSF/CSI/DIS has a period changing with a presence/absence of a CSI signal, the predetermined numbers D and E of times can be properly set so that reliable communication can be made.

According to the ninth to eleventh embodiments, even if a partner communication apparatus is not compatible with an extended FIF of a DIS signal, since a pre-procedure error occurs, reliable communication can be executed through re-dialing. High performance communication can be made with a partner communication apparatus having an extended FIF of a DIS signal.

What is claimed is:

1. A communication apparatus comprising:
   a storage unit for registering a number of bytes of FIF of a DIS signal to be sent to a partner communication apparatus upon a call reception, for a telephone number of the partner communication apparatus;
   a detector for detecting the telephone number of the partner communication apparatus prior to a call connection; and
   a transmitter for sending a DIS signal with a number of bytes of FIF changed in accordance with a registration of said storage unit.

2. A communication apparatus according to claim 1, wherein, if a communication error occurs after the DIS signal with a predetermined number A of bytes of FIF is sent upon the call reception and the predetermined number A of bytes is stored for the partner communication apparatus, and, if the communication error occurs consecutively a predetermined number of times, a DIS signal with a predetermined number B (A>B) of bytes of FIF is sent upon the call reception of the partner communication apparatus.

3. A communication apparatus according to claim 2, wherein, if a communication error occurs after the DIS signal with the predetermined number B of bytes of FIF is sent upon the call reception and the predetermined number A of bytes is stored for the partner communication apparatus, and, if the communication error occurs consecutively a predetermined number of times, a DIS signal having a predetermined number C (B>C) of bytes of FIF is sent upon the call reception of the partner communication apparatus.

4. A communication apparatus according to any one of claims 1 to 3, wherein a number of bytes of FIF of a DCS signal sent from the partner communication apparatus and FIF data are analyzed to determine a minimum number of bytes of FIF of the DIS signal.

5. A communication apparatus comprising:
   a transmitter for sending a DIS signal and changing a number of bytes of FIF of the DIS signal,
   wherein, if a communication error occurs after the DIS signal with a predetermined number D of bytes of FIF is sent upon a call reception, a DIS signal having a predetermined number E (D>E) of bytes of FIF is sent upon a subsequent call reception in a predetermined time period after occurrence of the communication error.

6. A facsimile apparatus for image communication using a communication procedure signal based on ITU-T Recommendation T. 30, said apparatus comprising:

a controller for sending in a predetermined communication phase to a partner communication apparatus an initial identification signal, wherein a number of bytes of a facsimile information field of the initial identification signal is changed in accordance with a response state of the partner communication apparatus after receiving the initial identification signal.

7. A facsimile apparatus according to claim 6, wherein the initial identification signal is a DIS signal.

8. A facsimile apparatus according to claim 6, wherein, if an initial identification signal with A bytes of a facsimile information field is sent and an effective response from the partner communication apparatus cannot be received consecutively a number C of times, an initial identification signal with B (A>B) bytes of a facsimile information field is sent.

9. A facsimile apparatus, comprising:

a controller for sending in a predetermined communication phase to a partner communication apparatus an initial identification signal, wherein a number of bytes of a facsimile information field of the initial identification signal is changed in accordance with a response state of the partner communication apparatus after receiving the initial identification signal, and the initial identification signal with the changed number of bytes of the facsimile information field is sent to the partner communication apparatus in a succeeding communication phase.

10. A data communication apparatus for performing data communication according to V. 34, V. 8, V. 21, V. 27 ter, V. 29, and V. 17 standards recommended by ITU-T, said apparatus comprising:

a transmitter for sending an ANSam signal upon a call reception, wherein if a CM signal is received from a partner communication apparatus, a DIS signal with a predetermined number A of bytes of FIF is sent upon a succeeding call reception, if the CM signal cannot be received from the partner communication apparatus, a DIS signal with the predetermined number A of bytes of FIF of the V. 21 standard is sent, and if an effective signal cannot be received from the partner communication apparatus consecutively a predetermined number C of times, a DIS signal with a predetermined number B of bytes of FIF of the V. 21 standard is sent.

11. A data communication apparatus according to claim 10, wherein, if the CM signal is received from the partner communication apparatus after the ANSam signal is sent or if a CI signal of the V. 8 standard is received after the DIS signal with the predetermined number A of bytes of FIF of the V. 21 standard is sent, and if a control is shifted to a protocol sequence of the V. 34 standard, then the DIS signal always with the predetermined number A of bytes of FIF is sent.

12. A data communication apparatus for facsimile communication according to a T. 30 standard recommended by ITU-T, said apparatus comprising:

a transmitter for sending a DIS signal with F bytes of FIF as an initial identification signal a predetermined number D of times upon a call reception or a call incoming, sending a DIS signal with G bytes of FIF as the initial identification signal from a time in excess of the predetermined number D of times to a predetermined number E of times, and sending a DIS signal with H bytes of FIF as the initial identification signal from a time in excess of the predetermined number E.

13. A data communication apparatus for facsimile communication according to a T. 30 standard recommended by ITU-T, said apparatus comprising:

a transmitter for sending a DIS signal with a predetermined number I of bytes of FIF as an initial identification signal upon a call reception, wherein, if a pre-procedure error occurs, a DIS signal with a predetermined number J of bytes of FIF is sent as the initial identification signal for a next call reception.

14. A data communication apparatus for facsimile communication according to a T. 30 standard recommended by ITU-T, said apparatus comprising:

a transmitter for sending a DIS signal with a predetermined number I of bytes of FIF as an initial identification signal upon a call reception, wherein, if a pre-procedure error occurs, a DIS signal with a predetermined number J of bytes of FIF is sent as the initial identification signal during a predetermined time period K for a next call reception after occurrence of the error.

15. A communication method of a data communication apparatus, said method comprising:

a registration step of registering a number of bytes of FIF of a DIS signal to be sent to a partner communication apparatus upon a call reception, for a telephone number of the partner communication apparatus;

a detection step of detecting the telephone number of the partner communication apparatus prior to a call connection; and a transmission step of sending a DIS signal with a number of bytes of FIF changed in accordance with a registration in said registration step.

16. A communication method of a data communication apparatus, said method comprising:

a transmission step of sending a DIS signal in which a number of bytes of FIF of the DIS signal is changed, wherein, if a communication error occurs after the DIS signal with a predetermined number D of bytes of FIF is sent upon a call reception, a DIS signal having a predetermined number E (D>E) of bytes of FIF is sent upon a subsequent call reception in a predetermined time period after occurrence of the communication error.

17. An image communication method of an image communication apparatus that utilizes a communication procedure signal based on ITU-T Recommendation T. 30, said method comprising:

a transmission step of sending in a predetermined communication phase to a partner communication apparatus an initial identification signal, wherein a number of bytes of a facsimile information field of the initial identification signal is changed in accordance with a response state of the partner communication apparatus after receiving the initial identification signal.

18. A facsimile communication method of a facsimile apparatus, said method comprising:

a transmission step of sending in a predetermined communication phase to a partner communication apparatus an initial identification signal, wherein a number of bytes of a facsimile information field of the initial identification signal is changed in accordance with a response state of the partner communication apparatus after receiving the initial identification signal, and the initial identification signal with the changed number of bytes of the facsimile information field is sent to the partner communication apparatus in a succeeding communication phase.

19. A data communication method of a data communication apparatus for performing data communication according to V. 34, V. 8, V. 21, V. 27 ter, V. 29, and V. 17 standards recommended by ITU-T, said method comprising:

a transmission step of sending an ANSam signal upon a call reception, wherein if a CM signal is received from a partner communication apparatus, a DIS signal with a predetermined number A of bytes of FIF is sent upon a succeeding call reception, if the CM signal cannot be received from the partner communication apparatus, a DIS signal with the predetermined number A of bytes of FIF of the V. 21 standard is sent, and if an effective signal cannot be received from the partner communication apparatus consecutively a predetermined number C of times, a DIS signal with a predetermined number B of bytes of FIF of the V. 21 standard is sent.

20. A data communication method for a data communication apparatus that performs facsimile communication according to a T. 30 standard recommended by ITU-T, said method comprising:

a transmission step of sending a DIS signal with F bytes of FIF as an initial identification signal a predetermined number D of times upon a call reception or a call incoming, sending a DIS signal with G bytes of FIF as the initial identification signal from a time in excess of the predetermined number D of times to a predetermined number E of times, and sending a DIS signal with H bytes of FIF as the initial identification signal from a time in excess of the predetermined number E.

21. A data communication method for a data communication apparatus that performs facsimile communication according to a T. 30 standard recommended by ITU-T, said method comprising:

a transmission step of sending a DIS signal with a predetermined number I of bytes of FIF as an initial identification signal upon a call reception, wherein, if a pre-procedure error occurs, a DIS signal with a predetermined number J of bytes of FIF is sent as the initial identification signal for a next call reception.

22. A data communication method for a data communication apparatus that performs facsimile communication according to a T. 30 standard recommended by ITU-T, said method comprising:

a transmission step of sending a DIS signal with a predetermined number I of bytes of FIF as an initial identification signal upon a call reception, wherein, if a pre-procedure error occurs, a DIS signal with a predetermined number J of bytes of FIF is sent as the initial identification signal during a predetermined time period K for a next call reception after occurrence of the error.

* * * * *

UNITED STATES PATENT AND TRADEMARK OFFICE
CERTIFICATE OF CORRECTION

PATENT NO.     : 6,456,398 B1
DATED          : September 24, 2002
INVENTOR(S)    : Takehiro Yoshida It is certified that error appears in the above-identified patent and that said Letters Patent is hereby corrected as shown below:

<u>Title page,</u>
Item [56], References Cited, FOREIGN PATENT DOCUMENTS,
"11122465     *      10/1995" should read -- 11-122465     *     10/1997 --.

<u>Column 18, line 22, - Column 22, line 32,</u>
Claims 1-22 should be deleted and substituted with the following claims 1-22:

--1.    A communication apparatus comprising:

a storage unit for registering a number of bytes of FIF of a DIS signal to be sent to a partner communication apparatus upon a call reception, for a telephone number of the partner communication apparatus;

a detector for detecting the telephone number of the partner communication apparatus prior to a call connection; and a transmitter for sending a DIS signal with a variable-length FIF, wherein a number of bytes of the variable-length FIF is changed in accordance with a registration of said storage unit.

2.    A communication apparatus according to Claim 1, wherein, if a communication error occurs after the DIS signal with a predetermined number A of bytes of FIF is sent upon the call reception and the predetermined number A of bytes is stored for the partner communication apparatus, and, if the communication error occurs consecutively a predetermined number of times, a DIS signal with a predetermined number B (A>B) of bytes of FIF is sent upon the call reception of the partner communication apparatus.

3.    A communication apparatus according to Claim 2, wherein, if a communication error occurs after the DIS signal with the predetermined number B of bytes of FIF is sent upon the call reception and the predetermined number A of bytes is stored for the partner communication apparatus, and, if the communication error occurs consecutively a predetermined number of times, a DIS signal having a predetermined number C (B>C) of bytes of FIF is sent upon the call reception of the partner communication apparatus.

4.    A communication apparatus according to any one of Claims 1 to 3, wherein a number of bytes of FIF of a DCS signal sent from the partner communication apparatus and FIF data are analyzed to determine a minimum number of bytes of FIF of the DIS signal.

5.    A communication apparatus comprising:

a transmitter for sending a DIS signal with a variable-length FIF and changing a number of bytes of the variable-length FIF of the DIS signal, wherein, if a communication error occurs after the DIS signal with a predetermined number D of bytes of FIF is sent upon a call reception, a DIS signal having a predetermined number E (D>E) of bytes of FIF is sent upon a subsequent call reception in a predetermined time period after occurrence of the communication error.

UNITED STATES PATENT AND TRADEMARK OFFICE
CERTIFICATE OF CORRECTION

PATENT NO.     : 6,456,398 B1
DATED          : September 24, 2002
INVENTOR(S)    : Takehiro Yoshida It is certified that error appears in the above-identified patent and that said Letters Patent is hereby corrected as shown below:

Column 18, line 22, - Column 22, line 32 (cont'd),

6.     A facsimile apparatus for image communication using a communication procedure signal based on ITU-T Recommendation T. 30, said apparatus comprising:

a controller for sending in a predetermined communication phase to a partner communication apparatus an initial identification signal, wherein a number of bytes of a variable-length facsimile information field of the initial identification signal is changed in accordance with a response state of the partner communication apparatus after receiving the initial identification signal.

7.     A facsimile apparatus according to Claim 6, wherein the initial identification signal is a DIS signal.

8.     A facsimile apparatus according to Claim 6, wherein, if an initial identification signal with A bytes of a facsimile information field is sent and an effective response from the partner communication apparatus cannot be received consecutively a number C of times, an initial identification signal with B (A>B) bytes of a facsimile information field is sent.

9.     A facsimile apparatus, comprising:

a controller for sending in a predetermined communication phase to a partner communication apparatus an initial identification signal, wherein a number of bytes of a variable-length facsimile information field of the initial identification signal is changed in accordance with a response state of the partner communication apparatus after receiving the initial identification signal, and the initial identification signal with the changed number of bytes of the variable-length facsimile information field is sent to the partner communication apparatus in a succeeding communication phase.

10.    A data communication apparatus for performing data communication according to V. 34, V. 8, V. 21, V. 27 ter, V. 29, and V. 17 standards recommended by ITU-T, said apparatus comprising:

a transmitter for sending an ANSam signal upon a call reception and for sending a DIS signal with a variable-length FIF, wherein if a CM signal is received from a partner communication apparatus, a DIS signal with a predetermined number A of bytes of FIF is sent upon a succeeding call reception, if the CM signal cannot be received from the partner communication apparatus, a DIS signal with the predetermined number A of bytes of FIF of the V. 21 standard is sent, and if an effective signal cannot be received from the partner communication apparatus consecutively a predetermined number C of times, a DIS signal with a predetermined number B of bytes of FIF of the V. 21 standard is sent.

UNITED STATES PATENT AND TRADEMARK OFFICE
CERTIFICATE OF CORRECTION

PATENT NO.    : 6,456,398 B1
DATED         : September 24, 2002
INVENTOR(S)   : Takehiro Yoshida It is certified that error appears in the above-identified patent and that said Letters Patent is hereby corrected as shown below:

Column 18, line 22, - Column 22, line 32 (cont'd),

11.    A data communication apparatus according to Claim 10, wherein, if the CM signal is received from the partner communication apparatus after the ANSam signal is sent or if a CI signal of the V. 8 standard is received after the DIS signal with the predetermined number A of bytes of FIF of the V. 21 standard is sent, and if a control is shifted to a protocol sequence of the V. 34 standard, then the DIS signal always with the predetermined number A of bytes of FIF is sent.

12.    A data communication apparatus for facsimile communication according to a T. 30 standard recommended by ITU-T, said apparatus comprising:

a transmitter for sending a DIS signal with a variable-length FIF, wherein said transmitter sends a DIS with F bytes of FIF as an initial identification signal a predetermined number D of times upon a call reception or a call incoming, sends a DIS signal with G bytes of FIF as the initial identification signal from a time in excess of the predetermined number D of times to a predetermined number E of times, and sends a DIS signal with H bytes of FIF as the initial identification signal from a time in excess of the predetermined number E.

13.    A data communication apparatus for facsimile communication according to a T. 30 standard recommended by ITU-T, said apparatus comprising:

a transmitter for sending a DIS signal with a variable-length FIF, wherein a DIS signal with a predetermined number I of bytes of FIF is sent as an initial identification signal upon a call reception, and wherein, if a pre-procedure error occurs, a DIS signal with a predetermined number J of bytes of FIF is sent as an initial identification signal for a next call reception.

14.    A data communication apparatus for facsimile communication according to a T. 30 standard recommended by ITU-T, said apparatus comprising:

a transmitter for sending a DIS signal with a variable-length FIF, wherein a DIS signal with a predetermined number I of bytes of FIF is sent as an initial identification signal upon a call reception, and wherein, if a pre-procedure error occurs, a DIS signal with a predetermined number J of bytes of FIF is sent as an initial identification signal during a predetermined time period K for a next call reception after occurrence of the error.

UNITED STATES PATENT AND TRADEMARK OFFICE
CERTIFICATE OF CORRECTION

| | |
|---|---|
| PATENT NO. | : 6,456,398 B1 |
| DATED | : September 24, 2002 |
| INVENTOR(S) | : Takehiro Yoshida |

It is certified that error appears in the above-identified patent and that said Letters Patent is hereby corrected as shown below:

<u>Column 18, line 22, - Column 22, line 32 (cont'd),</u>

15.    A communication method of a data communication apparatus, said method comprising:

a registration step of registering a number of bytes of FIF of a DIS signal to be sent to a partner communication apparatus upon a call reception, for a telephone number of the partner communication apparatus;

a detection step of detecting the telephone number of the partner communication apparatus prior to a call connection; and a transmission step of sending a DIS signal with a variable-length FIF, wherein a number of bytes of the variable-length FIF is changed in accordance with a registration in said registration step.

16.    A communication method of a data communication apparatus, said method comprising:

a transmission step of sending a DIS signal with a variable-length FIF, in which a number of bytes of the variable-length FIF of the DIS signal is changed, wherein, if a communication error occurs after the DIS signal with a predetermined number D of bytes of FIF is sent upon a call reception, a DIS signal having a predetermined number E (D>E) of bytes of FIF is sent upon a subsequent call reception in a predetermined time period after occurrence of the communication error.

17.    An image communication method of an image communication apparatus that utilizes a communication procedure signal based on ITU-T Recommendation T. 30, said method comprising:

a transmission step of sending in a predetermined communication phase to a partner communication apparatus an initial identification signal, wherein a number of bytes of a variable-length facsimile information field of the initial identification signal is changed in accordance with a response state of the partner communication apparatus after receiving the initial identification signal.

18.    A facsimile communication method of a facsimile apparatus, said method comprising:

a transmission step of sending in a predetermined communication phase to a partner communication apparatus an initial identification signal, wherein a number of bytes of a variable-length facsimile information field of the initial identification signal is changed in accordance with a response state of the partner communication apparatus after receiving the initial identification signal, and the initial identification signal with the changed number of bytes of the facsimile information field is sent to the partner communication apparatus in a succeeding communication phase.

UNITED STATES PATENT AND TRADEMARK OFFICE
CERTIFICATE OF CORRECTION

PATENT NO. : 6,456,398 B1          Page 5 of 6
DATED : September 24, 2002
INVENTOR(S) : Takehiro Yoshida It is certified that error appears in the above-identified patent and that said Letters Patent is hereby corrected as shown below:

Column 18, line 22, - Column 22, line 32 (cont'd),

19. A data communication method of a data communication apparatus for performing data communication according to V. 34, V. 8, V. 21, V. 27 ter, V. 29, and V. 17 standards recommended by ITU-T, said method comprising:

a transmission step of sending an ANSam signal upon a call reception and sending a DIS signal with a variable-length FIF, wherein if a CM signal is received from a partner communication apparatus, a DIS signal with a predetermined number A of bytes of FIF is sent upon a succeeding call reception, if the CM signal cannot be received from the partner communication apparatus, a DIS signal with the predetermined number A of bytes of FIF of the V. 21 standard is sent, and if an effective signal cannot be received from the partner communication apparatus consecutively a predetermined number C of times, a DIS signal with a predetermined number B of bytes of FIF of the V. 21 standard is sent.

20. A data communication method for a data communication apparatus that performs facsimile communication according to a T. 30 standard recommended by ITU-T, said method comprising:

a transmission step of sending a DIS signal with a variable-length FIF, wherein a DIS signal with F bytes of FIF is sent as an initial identification signal a predetermined number D of times upon a call reception or a call incoming, a DIS signal with G bytes of FIF is sent as an initial identification signal from a time in excess of the predetermined number D of times to a predetermined number E of times, and a DIS signal with H bytes of FIF is sent as an initial identification signal from a time in excess of the predetermined number E of times.

21. A data communication method for a data communication apparatus that performs facsimile communication according to a T. 30 standard recommended by ITU-T, said method comprising:

a transmission step of sending a DIS signal with a variable-length FIF, wherein a DIS signal with a predetermined number I of bytes of FIF is sent as an initial identification signal upon a call reception, and wherein, if a pre-procedure error occurs, a DIS signal with a predetermined number J of bytes of FIF is sent as an initial identification signal for a next call reception.

UNITED STATES PATENT AND TRADEMARK OFFICE
CERTIFICATE OF CORRECTION

PATENT NO. : 6,456,398 B1
DATED : September 24, 2002
INVENTOR(S) : Takehiro Yoshida It is certified that error appears in the above-identified patent and that said Letters Patent is hereby corrected as shown below:

<u>Column 18, line 22, - Column 22, line 32 (cont'd),</u>

22. A data communication method for a data communication apparatus that performs facsimile communication according to a T. 30 standard recommended by ITU-T, said method comprising:

a transmission step of sending a DIS signal with a variable-length FIF, wherein a DIS signal with a predetermined number I of bytes of FIF is sent as an initial identification signal upon a call reception, and wherein, if a pre-procedure error occurs, a DIS signal with a predetermined number J of bytes of FIF is sent as an initial identification signal during a predetermined time period K for a next call reception after occurrence of the error.--

Signed and Sealed this

Thirtieth Day of August, 2005

JON W. DUDAS
*Director of the United States Patent and Trademark Office*